US011058280B2

(12) United States Patent
Yoshimoto et al.

(10) Patent No.: US 11,058,280 B2
(45) Date of Patent: Jul. 13, 2021

(54) DISHWASHER

(71) Applicant: Samsung Electronics Co., Ltd, Suwon-si (KR)

(72) Inventors: Morio Yoshimoto, Kanagawa (JP); Katsunori Araki, Kanagawa (JP); Hisashi Kawasaki, Kanagawa (JP); Toshihiro Kamii, Kanagawa (JP); Kazuo Shimizu, Kanagawa (JP)

(73) Assignee: Samsung Electronics Co., Ltd., Suwon-si (KR)

(*) Notice: Subject to any disclaimer, the term of this patent is extended or adjusted under 35 U.S.C. 154(b) by 178 days.

(21) Appl. No.: 16/330,055

(22) PCT Filed: Aug. 31, 2017

(86) PCT No.: PCT/KR2017/009545

§ 371 (c)(1),
(2) Date: Mar. 1, 2019

(87) PCT Pub. No.: WO2018/044094

PCT Pub. Date: Mar. 8, 2018

(65) Prior Publication Data

US 2019/0200841 A1 Jul. 4, 2019

(30) Foreign Application Priority Data

Sep. 1, 2016 (JP) ............................ JP2016-170910
Dec. 27, 2016 (JP) ............................ JP2016-253750
(Continued)

(51) Int. Cl.
*A47L 15/42* (2006.01)
*G06T 7/73* (2017.01)
(Continued)

(52) U.S. Cl.
CPC ....... *A47L 15/4295* (2013.01); *A47L 15/0028* (2013.01); *A47L 15/42* (2013.01);
(Continued)

(58) Field of Classification Search
CPC ............. A47L 15/4295; A47L 2401/04; A47L 15/00–508
See application file for complete search history.

(56) References Cited

U.S. PATENT DOCUMENTS 6,463,940 B1 10/2002 Thomas et al.
8,696,827 B2 4/2014 Ashrafzadeh et al.
(Continued)

FOREIGN PATENT DOCUMENTS

DE 10048081 A1 4/2002
EP 1192893 B1 11/2004
(Continued)

OTHER PUBLICATIONS

Communication pursuant to Article 94(3) EPC in connection with European Application No. 17847019.1 dated Jul. 17, 2020, 4 pages.
(Continued)

*Primary Examiner* — Spencer E Bell

(57) ABSTRACT

Disclosed herein is useful as a stored object detector and a method of detecting stored objects configured to capture an image a movable storage portion, and objects stored in the storage portion, and configured to acquire storage information including at least one of position, size and quantity of the stored object based on the captured image. In addition, disclosed herein is a dishwasher configured to identify at least storage area of dish stored in a dish storage basket. It is possible to estimate a position of a basket, although the number of feature points is small. Therefore, when installing a detection indicator corresponding to the feature point, which is separated from the general configuration, to the
(Continued)

101
119 103b 103
103a
103e
105
105c
105b
107c
107
103d
104 107b 104b 103e 103c basket, it is not required to install a large number of detection indicator, and thus it is possible to improve the appearance of the dishwasher. In addition, since it is possible to use the configuration that is generally installed in the basket, as the feature point, it is not required to additionally install the detection indicator and thus it is possible to improve the appearance of the dishwasher.

12 Claims, 31 Drawing Sheets

(30) Foreign Application Priority Data

Dec. 27, 2016 (JP) ............................ JP2016-254139
Jul. 27, 2017 (JP) ............................ JP2017-145572

(51) Int. Cl.
*A47L 15/00* (2006.01)
*A47L 15/50* (2006.01)

(52) U.S. Cl.
CPC ......... *A47L 15/4257* (2013.01); *A47L 15/501* (2013.01); *G06T 7/74* (2017.01); *A47L 2401/04* (2013.01); *A47L 2501/30* (2013.01); *A47L 2601/20* (2013.01); *G06T 2207/30204* (2013.01); *G06T 2207/30242* (2013.01)

(56) References Cited

U.S. PATENT DOCUMENTS

2007/0181162 A1 8/2007 Classen et al.
2010/0205825 A1* 8/2010 Ashrafzadeh .......... D06F 58/36 34/486
2012/0138092 A1 6/2012 Ashrafzadeh et al.
2016/0324396 A1 11/2016 Hong et al.

FOREIGN PATENT DOCUMENTS

JP 2003235781 A 8/2003
KR 10-1071831 B1 10/2011
KR 10-2015-0079221 A 7/2015
WO 2006015934 A1 2/2006

OTHER PUBLICATIONS

International Search Report dated Dec. 26, 2017 in connection with International Patent Application No. PCT/KR2017/009545, 2 pages.
Witten Opinion of the International Searching Authority dated Dec. 26, 2017 in connection with International Patent Application No. PCT/KR2017/009545, 7 pages.
European Patent Office, "Supplementary European Search Report," Application No. EP 178470191, dated Jul. 5, 2019, 8 pages.

* cited by examiner 101
103
103f
105a
103d
103f
110
105
109
105c
103b
103e
121
119
123
103a
105a
105b
108a
108b
111
112
115
113
103c
104a
104b
107a
107
107c
107a
104
107b 201
203
209
210
211
212
213
215
203a
208a
208b
205
219
221
223
220
204
207

DISHWASHER

CROSS-REFERENCE TO RELATED APPLICATIONS

This application is a 371 of International Application No. PCT/KR2017/009545 filed on Aug. 31, 2017, which claims priority to Japanese Patent Application No. 2016-170910 filed on Sep. 1, 2016, Japanese Patent Application No. 2016-253750 filed on Dec. 27, 2016, Japanese Patent Application No. 2016-254139 filed Dec. 27, 2016, and Japanese Patent Application No. 2017-145572 filed on Jul. 27, 2017, the disclosures of which are herein incorporated by reference in their entirety.

BACKGROUND

1. Field

The present invention relates to a dishwasher having a basket position estimating apparatus, a stored object detector and a method of detecting stored objects.

2. Description of Related Art

Patent document 1 (U.S. Pat. No. 8,696,827) discloses a stored object detector that captures an image of a movable storage portion and objects stored in the storage portion, and that acquires storage information including a position of object stored in the storage portion, based on the captured image. In the stored object detector, a position indicator is installed on every certain area on the side portion of the storage portion, and the position of object stored in the storage portion in a part, which is displayed on the captured image, is specified based on the position indicator contained in the captured image.

Further, in the conventional manner, a dishwasher supplies a predetermined amount of washing water, increases a temperature of the washing water to reach a predetermined temperature by a heater, identifies an amount of dishes based on a period of time that is taken for the rise of the temperature, and optimally controls a washing operation and a rinsing operation based on the identified amount of dishes (e.g., refer to patent document 2 (Japanese unexamined patent publication No. 10-014849)).

Further, the dishwasher is configured to detect the amount of the dishes stored in the storage basket by using a weight sensor, and detect a dirty degree of the dishes based on a dirty degree of the washing water, thereby optimally controlling a washing operation and a rinsing operation (e.g., refer to patent document 2 (Japanese unexamined patent publication No. 04-312434)).

However, the stored object detector described in the patent document 1 has the position indicator on every certain area of the side portion of the storage, and thus it leads the degradation in the appearance. In addition, since a position of a part, which is captured on the image, in the storage portion is acquired with the precision, which is according to the interval of the position indicator, it is difficult to sufficiently improve the accuracy of the acquired storage information.

Further, as for the dishwasher disclosed in the patent document 2, it is difficult to precisely identify the amount of dishes since the time taken for increasing the temperature of the water is greatly changed according to a material and a shape of the dishes subjected to be washed, and a temperature of the dishes upon being stored in the dishwasher.

In addition, in the dishwasher disclosed in the patent document 3, it is difficult to precisely identify the amount of dishes due to the material and the shape of the dishes subjected to be washed and the measurement precision of the weight sensor. In addition, although the dish is disposed in a part of the storage basket, the dishwasher cannot detect it, and thus the dishwasher washes the entire area of the storage basket. Therefore, it leads problems in terms of energy saving and shortening of operation time.

In order to solve the above-mentioned problems, according to one aspect of the present disclosure, a first purpose of the present disclosure is to improve an appearance of a storage portion provided with a basket position estimating apparatus, and as for a stored object detector and a method of detecting stored objects, a second purpose is to improve the accuracy of the storage information while improving the appearance of the storage portion. In addition, as for a dishwasher, a third purpose is to identify dishes by high precisely detecting at least storage area of the dishes stored in a storage basket.

In addition, in the present disclosure, the above-mentioned three purposes must be not satisfied at the same time.

SUMMARY

One aspect of the present disclosure provides a dishwasher including a washing tub, a storage portion installed in the washing tub and configured to store a dish, an imaging portion configured to capture an image of the storage portion and the dish stored in the storage portion and a processor configured to acquire a feature point from an image captured by the imaging portion, and configured to identify a position of the dish by recognizing a position of the storage portion based on the detected feature point.

The processor may acquire storage information including at least one of a position, size and quantity of the dish based on the image captured by the imaging portion.

The feature point may be a position recognition mark provided in the storage portion, and the position recognition mark may be composed of characters, symbols, saturation, brightness or patterns or a combination thereof.

The storage portion may be installed in the washing tub to be withdrawable through an opening of the washing tub, and the imaging portion may be installed around the opening of the washing tub to capture an image of a part of the storage portion that is taken out of the washing tub.

The dishwasher may further include a door configured to open and close the opening, and the door may be provided with a position identification pattern, and the processor may identify the position identification pattern based on the image captured by the imaging portion, and identify a placement area in which the dish is stored, by using the position identification pattern.

The imaging portion may captures an image of every withdrawal position of the storage portion, and the processor may select an image, which is needed to identify the dish, from a plurality of captured images, and identify a placement area, quantity, shape, and types of the dish based on a state of the position identification pattern.

The dishwasher may further include a washing portion configured to wash the dish, and the processor may selectively perform washing on an area in which the dish is disposed, by controlling the washing portion.

The processor may regulate a washing time to allow washing to be selectively performed on an area in which the dish is disposed.

The imaging portion may include a camera, an area sensor or a line sensor.

Another aspect of the present disclosure provides a dishwasher including a washing tub, a storage portion movably installed in the washing tub and configured to store a dish, an imaging portion configured to capture an image of the storage portion and the dish stored in the storage portion, and a processor configured to acquire storage information including at least one of a position, size and quantity of the dish based on the image captured by the imaging portion. The storage portion is provided with a position recognition feature point, and the processor acquires the feature point from an image captured by the imaging portion, and identifies a position of the dish by recognizing a position of the storage portion based on the acquired feature point.

The feature point may be one or more indicator provided in the storage portion, and the processor may identify a certain indicator from the captured image, recognize a position of the storage portion based on a position of the indicator, and acquire the storage information based on the recognized position of the storage portion.

The processor may identify the indicator based on at least one of a predetermined shape, color, characters, and figures of indicator.

Another aspect of the present disclosure provides a dishwasher including a washing tub provided with an opening, a storage portion installed in the washing tub to be withdrawable through the opening and configured to store a dish, and a processor configured to measure a withdrawal amount representing that how far the storage portion is taken out of the washing tub, and configured to identify a position of the storage portion based on the measured withdrawal amount.

The processor may include a distance image sensor, a winding machine, a weight sensor or a camera.

The processor may further include an imaging portion configured to capture an image of a shape of the storage portion, and the processor may compare the captured image with a pre-stored image, and acquire storage information including at least one of a position, size and quantity of the dish, based on a comparison result.

According to the proposed basket position estimating apparatus, it is possible to estimate a position of a basket although the number of feature points is small. Therefore, when installing a detection indicator corresponding to the feature point, which is separated from the general configuration, to the basket, it is not required to install a large number of detection indicator, and thus it is possible to improve the appearance of the dishwasher. In addition, since it is possible to use the configuration that is generally installed in the basket, as the feature point, it is not required to additionally install the detection indicator and thus it is possible to improve the appearance of the dishwasher.

According to the proposed stored object detector and method of detecting stored objects, it is possible to specify a part, which is captured on the detection image, in the storage portion although the number of indicators is small. Therefore, despite of installing a detection indicator corresponding to the feature point, which is separated from the general configuration, to the basket, it is possible to allow the number of indicators to be small, in comparison with the case of installing an indicator every area as disclosed in the patent document 1. Accordingly, it is possible to improve the appearance of the storage portion. In addition, since it is possible to use the configuration that is generally installed in the basket, as the feature point, it is not required to additionally install the detection indicator and thus it is possible to improve the appearance of the storage portion. In addition, since it is possible to specify a part, which is captured on the detection image, in the storage portion although the number of indicators is small, it is possible to increase the accuracy of the acquired storage information, without deteriorating the appearance.

Further, according to the proposed dishwasher, it is possible to detect and identify at least storage area of the dish stored in the dish storage basket, with high precision.

BRIEF DESCRIPTION OF THE DRAWINGS

FIG. 25 is a plan view of a recognition mark configured to easily identify whether a dish is stored in a storage basket of the dishwasher according to the eighth embodiment.

DETAILED DESCRIPTION

Figure 1:
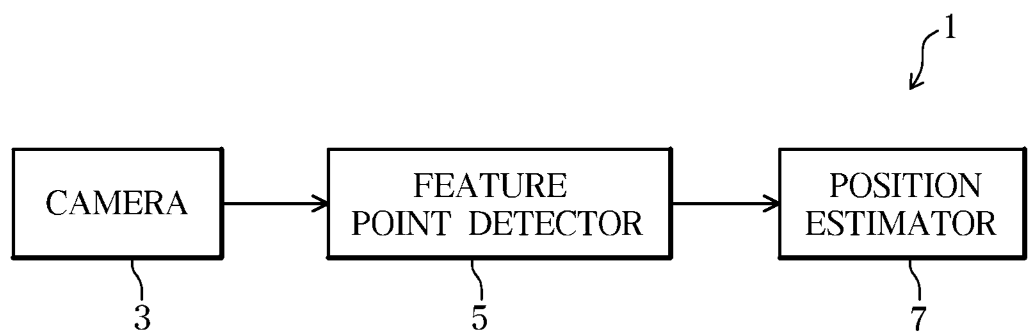
FIG. 1 is a block diagram showing a configuration of a basket position estimating apparatus according to a first embodiment of the present disclosure.

Embodiments described in the present disclosure and configurations shown in the drawings are merely examples of the embodiments of the present disclosure, and may be modified in various different ways at the time of filing of the present application to replace the embodiments and drawings of the present disclosure.

Also, the terms used herein are used to describe the embodiments and are not intended to limit and/or restrict the present disclosure. The singular forms "a," "an" and "the" are intended to include the plural forms as well, unless the context clearly indicates otherwise. In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

The present disclosure will be described more fully hereinafter with reference to the accompanying drawings In the above-described patent document 1, as a method of estimating the basket position of the dishwasher, a method of capturing a position indicator provided for each predetermined area of a side portion of a rack is disclosed. However, according to the patent document 1, since the position indicator is provided for each area of the side portion of the rack, it leads bad effect on the appearance.

Therefore, according to a first embodiment and a second embodiment of the present disclosure, it may be possible to equip a basket position estimating apparatus while improving of the appearance of the dishwasher.

First Embodiment

First, a first embodiment according to the present disclosure will be described.

Figure 2:
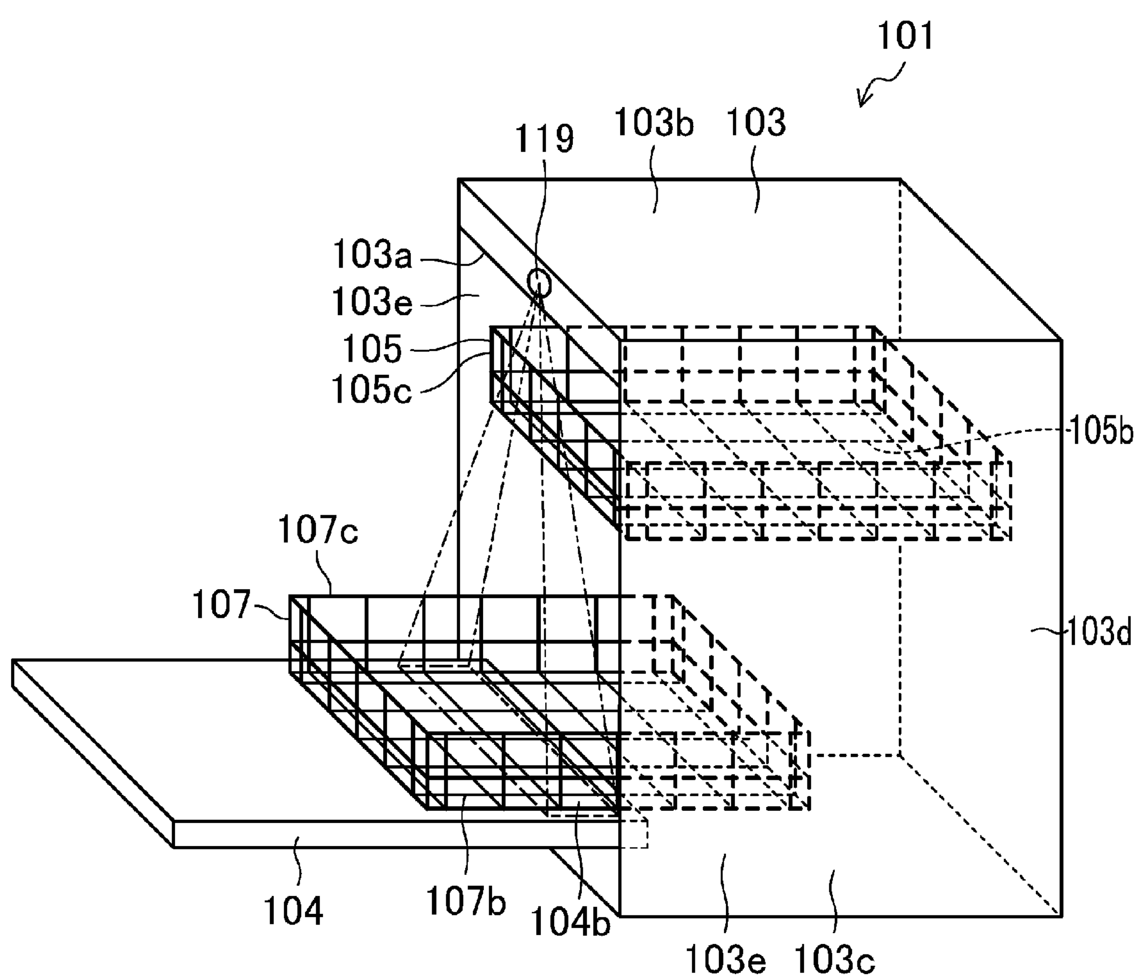
FIG. 2 is a schematic perspective view of a dishwasher provided with the basket position estimating apparatus according to the first embodiment, in a state in which a part of a lower basket is taken out when a door is open.
Figure 3:
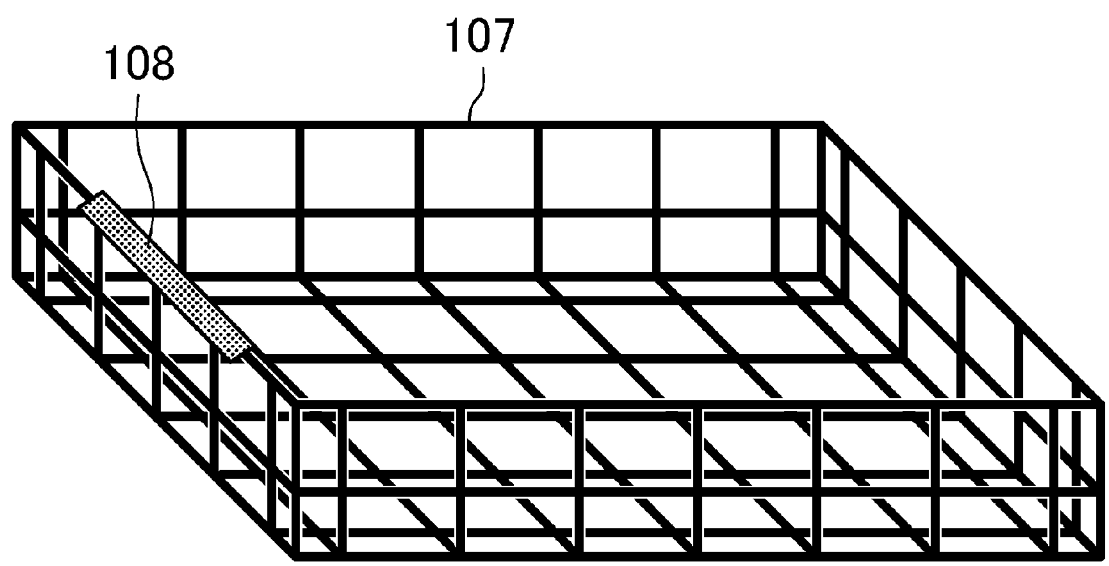
FIG. 3 is a schematic perspective view of the lower basket of FIG. 2.

FIG. 1 is a block diagram showing a configuration of a basket position estimating apparatus according to a first embodiment of the present disclosure, FIG. 2 is a schematic perspective view of a dishwasher provided with the basket position estimating apparatus according to the first embodiment, in a state in which a part of a lower basket is taken out when a door is open, and FIG. 3 is a schematic perspective view of the lower basket of FIG. 2.

Referring to FIG. 1, the basket position estimating apparatus 1 according to the first embodiment may be installed in the dishwasher and may include a camera 3 corresponding to a visible imaging portion, a feature point detector 5 and a position estimator 7.

The basket position estimating apparatus 1 according to the first embodiment may be mounted on the dishwasher 101, as shown in FIG. 2.

In FIG. 2, when viewing from a plan on the front end portion (the left side of FIG. 2), the dishwasher 101 is provided with a box-shaped washing tub 103 having a rectangular shape opening 103*a*. The washing tub 103 includes an upper surface 103*b*, a bottom surface 103*c*, a rear surface 103*d* opposite to the opening 103*a*, and a pair of lateral surfaces 103*e* opposite to each other with respect to the opening 103*a* in a horizontal direction. In a lower edge portion of the opening 103*a* of the washing tub 103, a door 104, which has a rectangular and substantially plate shape when viewing from a sealable plane to the opening 103*a*, may be installed to be rotatable in the up and down direction by connecting its longitudinal end portion to a hinge portion 104*a*.

In addition, inside the washing tub 103, an upper basket 105 and a lower basket 107 are arranged at intervals so as to be taken out toward the opening 103*a* side of the washing tub 103.

Further, on a center portion, in the opposite direction of the both lateral surfaces 103*e*, on a cross section surface of a front end side of the upper surface of the upper surface 103*b* of the opening 103*a* of the washing tub 103, a visible camera 119 is disposed so as to be inclined downward the opening direction of the opening 103*a*. A position and a direction of the visible camera 119 (i.e., the camera 3 of FIG. 1) is set to capture an image an entire of the lower basket 107, which is taken out to a withdrawal position, and tableware stored in the lower basket 107. Therefore, the basket position estimating apparatus 1 according to the first embodiment may be installed at a position in which the visible camera 119 is disposed, or at a rear portion thereof.

The lower basket 107 is formed by crossing a linear material, and a color distinguishable from the surroundings is applied to the lower basket 107, as illustrated in a handle 108 of FIG. 3.

The detailed configuration of FIG. 2 will be described in a third embodiment to be described later.

Hereinafter a method of detecting stored objects using the basket position estimating apparatus 1 according to the first embodiment will be described with reference to FIG. 4.

Figure 4:
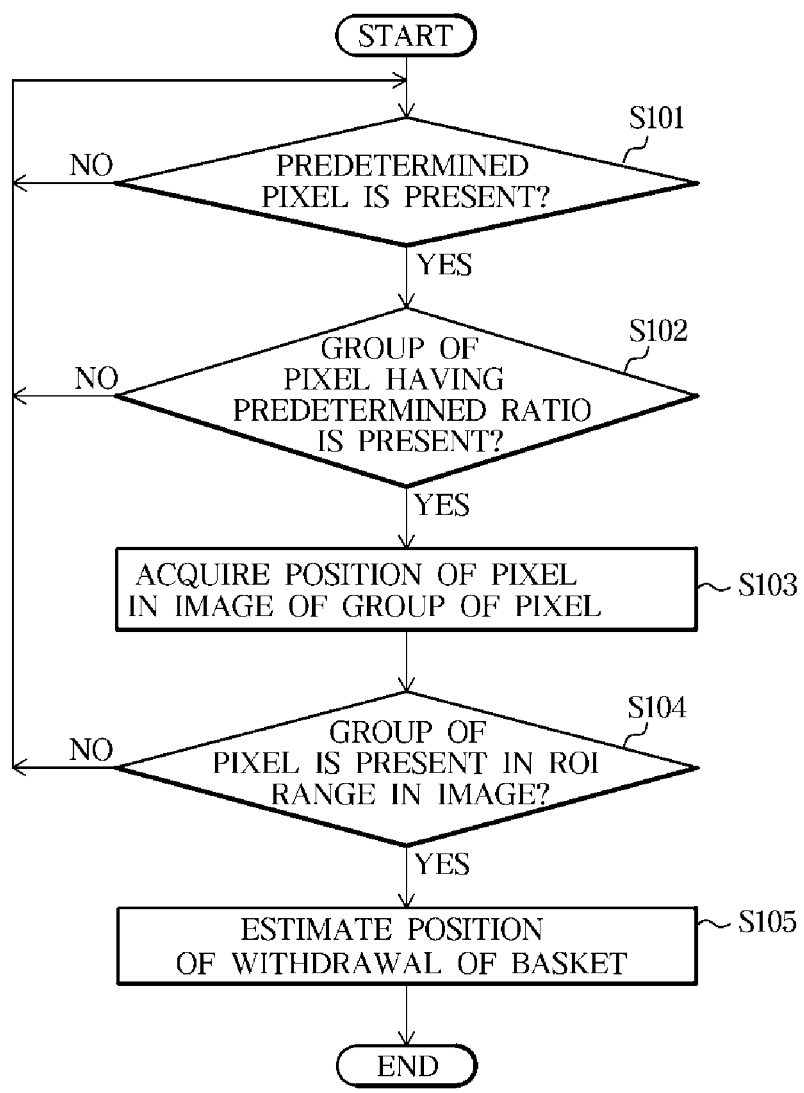
FIG. 4 is a flowchart showing a method of detecting stored objects by using the basket position estimating apparatus according to the first embodiment.

FIG. 4 is a flowchart showing a method of detecting stored objects by using the basket position estimating apparatus according to the first embodiment.

First, when the power is supplied to the basket position estimating apparatus 1, the camera 3 (refer to FIG. 1) captures an image of a certain position having an entire movement area of the lower basket 107, with visible light.

Then, based on the image captured by the camera 3, the feature point detector 5 detects the handle 108 of the lower basket 107 as a feature point based on a predetermined color of the handle 108 (step 101). Particularly, for example, when an area, which has a color of pixel having the same color or similar color with the predetermined color of the handle 108 with a predetermined ratio, is present in the image, it is detected as a feature point (step 102).

The position estimator 7 estimates a position of the lower basket 107 of the dishwasher 101 based on the positions of the feature points (step 103 and step 104) detected by the feature point detector 5, in the image (step 105).

The feature point detector 5 and the position estimator 7 are implemented with an arithmetic processing unit such as Central Processing Unit (CPU).

More particularly, the camera 3 captures an image of a certain position including the entire movement area of the lower basket 107. At this time, since the camera 3 captures an image of a predetermined position, it is possible to precisely estimate the position of the lower basket 107 based on the position of the handle 108 in the captured image. Thereafter, based on the image captured by the camera 3, the feature point detector 5 detects the feature point of the handle 108 based on the predetermined color of the handle 108.

The position estimator 7 estimates the position of the lower basket 107 of the dishwasher 101 based on the positions of the feature points detected by the feature point detector 5, in the image.

Therefore, according to the first embodiment, since the handle that is normally installed in the basket is used as a feature point, it is not required to separately provide a detection indicator for detection, and thus it is possible to improve the appearance of the dishwasher 101.

Further, when a stored position of the dish is specified according to the position of the basket, it is possible to reduce a time and energy for the washing, by limiting a washing range based on the estimated position of the basket.

Second Embodiment

Hereinafter a second embodiment according to the present disclosure will be described.

In the second embodiment, in a basket, a detection indicating portion is installed as an indicator. Therefore, based on an image captured by the camera 3, the feature point detector 5 detects a handle and a detection indicating portion as two feature points, based on a predetermined color of the handle of the basket and a predetermined color of the detection indicating portion, and the feature point detector 5 determines a reliability of two feature points based on the position of the two feature points in the image. When the feature point detector 5 determines that the reliability of two feature points is low, the feature point detector 5 does not output the detected position of the two feature points to the position estimator 7 and the camera 3 captures an image, again. Meanwhile, when the feature point detector 5 determines that the reliability of two feature points is high, the position estimator 7 estimates the position of the basket of the dishwasher, based on the detected position of the two feature points in the image. For example, when a relationship between the detected position of the handle in the image, and the detected position of the indicating portion in the image is a predetermined position relationship, the reliability is determined to be high and when the relationship therebetween is not the predetermined position relationship, the reliability is determined to be low.

Other configurations and operations are the same as those in the first embodiment, and thus a detail description thereof will be omitted.

Therefore, according to the second embodiment, by using the plurality of feature points, it is possible to estimate the position of the basket with high accuracy.

OTHER MODIFIED EXAMPLES

Figure 5:
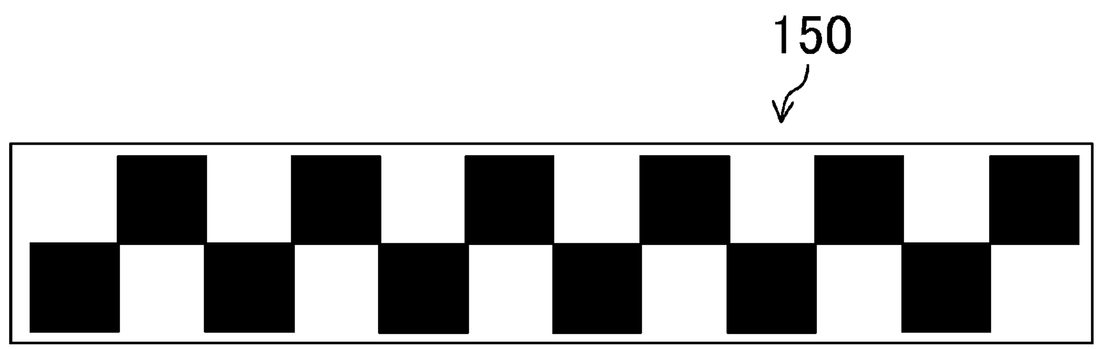
FIG. 5 is a plan view showing an identification pattern applied to a handle of the lower basket.
Figure 6:
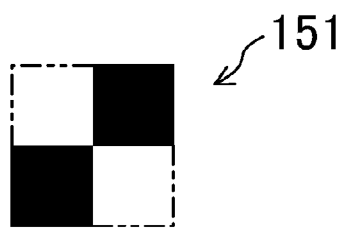
FIG. 6 is a plan view showing a comparison pattern of FIG. 5.

FIG. 5 is a plan view showing an identification pattern applied to a handle of the lower basket, and FIG. 6 is a plan view showing a comparison pattern of FIG. 5.

In the first and second embodiments of the present disclosure, the feature point detector 5 detects the handle or the detection indicating portion from the image, based on the predetermined color. However, this embodiment is not limited thereto, and it is possible to detect the handle or the detection indicating portion based on a predetermined shape (pattern).

For example, as illustrated in FIG. 5, a featured indicator may include a component, which is to be captured by the camera 3, such as an identification pattern 150 having a checkered pattern. By using the component, it is possible to compare it with a comparison pattern 151 of FIG. 6 and detect the position of the handle, thereby estimating the position of the basket.

For example, when the result of comparison indicates that two or more are consecutively arranged in the horizontal direction, it may be identified that the handle is detected.

In a state in which a handle has a pattern different from the pattern of FIG. 5, when the result of the comparison indicates that two or more are consecutively arranged in the vertical direction, it may be identified that the handle is detected. Alternatively, it may be possible to more improve the accuracy of the detection of the handle by adding a condition matched to a shape of the handle, such as a combination thereof, a combination of a color that is different from the surroundings, to a detection condition.

In the above first and second embodiments, as the feature point, the handle or the indicating portion are installed in the basket, but an intersection of the line-shape forming the lower basket 107 may be used as the feature point. This will be described with reference to FIGS. 7 and 8.

Figure 7:
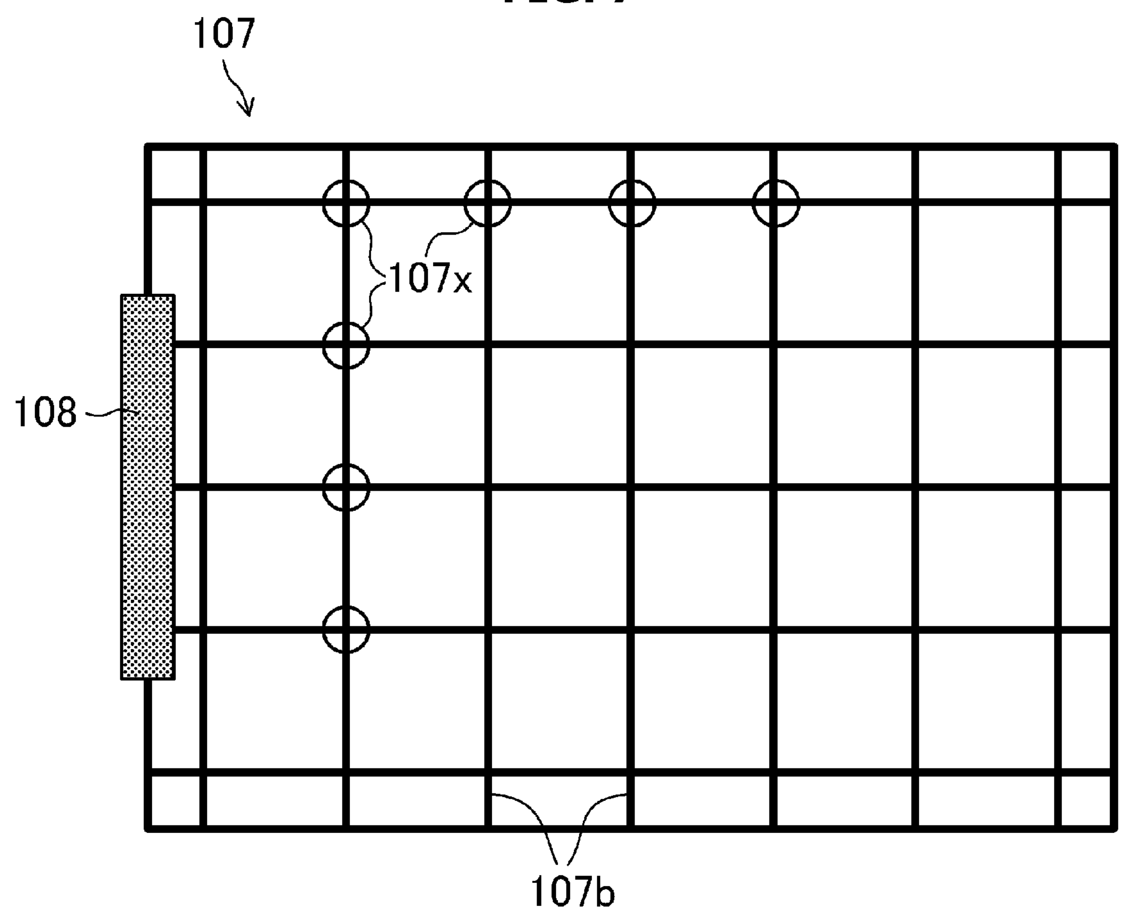
FIG. 7 is a schematic plan view showing a feature point defined as an indicator on the lower basket.
Figure 8:
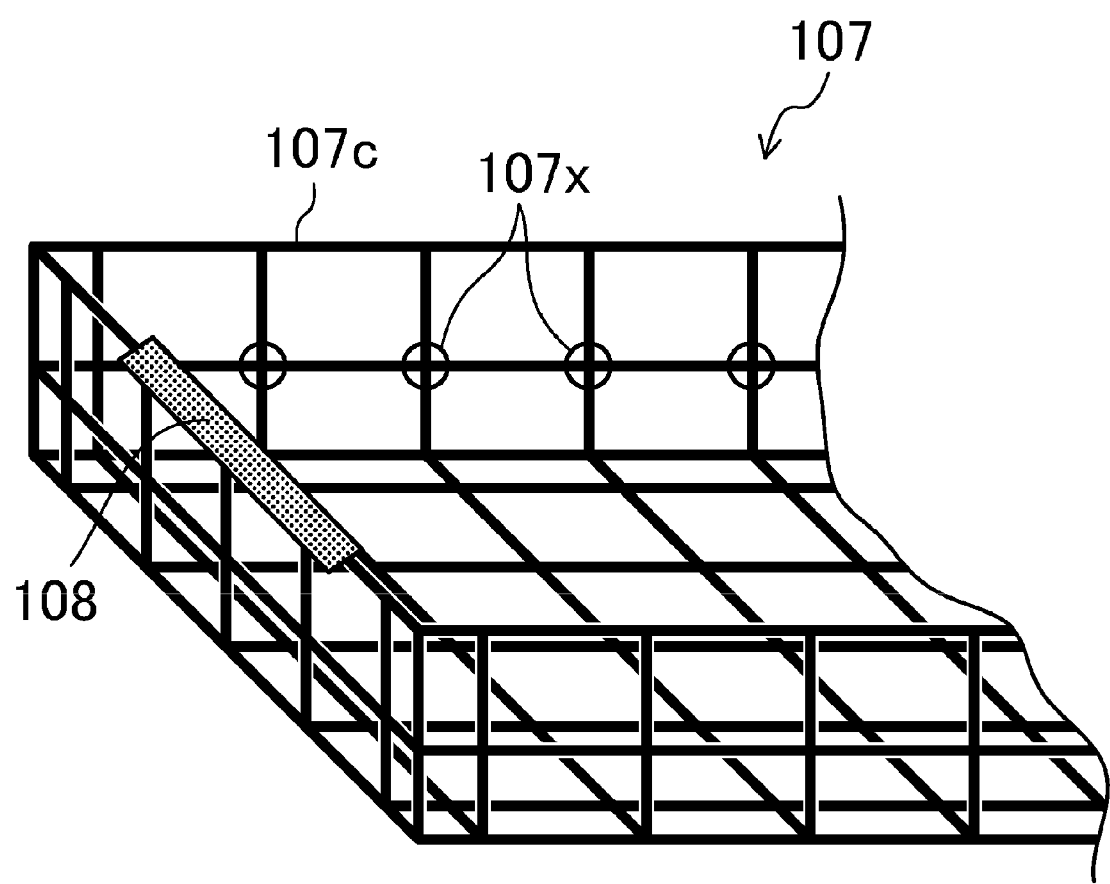
FIG. 8 is a schematic plan view showing another feature point defined as an indicator on the lower basket.

FIG. 7 is a schematic plan view showing a feature point defined as an indicator on the lower basket and FIG. 8 is a schematic plan view showing another feature point defined as an indicator on the lower basket.

In FIG. 7, at least one intersection **107*x* in a bottom portion 107*b* of the lower basket 107 may be defined as a feature point and in FIG. 8, and at least one intersection 107*x* in a surrounding wall 107*c* of the lower basket 107 may be defined as a feature point. Accordingly, the intersection 170*x* that is generally present in the lower basket 107 may be used as the feature point. For example, when two or more consecutive intersections are arranged in the vertical direction, it may be determined that the lower basket 107 is detected. Alternatively, when two or more consecutive intersections are arranged in the horizontal direction, it may be determined that the lower basket 107 is detected. In addition, by the shape of the basket or the object stored in the basket, such as a combination thereof, or a change in the quantity condition, a state in which the intersection 107*x*** is covered may vary. The position and the number of the intersection

107*x* corresponding to the detection condition may be easily changed. In addition, the combination of color or the combination of the shape of the handle is used as the detection condition, and thus it may be possible to improve the detection accuracy of the basket. Accordingly, since it is not required to separately install a detection indicator, it may be possible to improve the appearance of the dishwasher 101.

One or two feature points are used according to the first and second embodiments, but it may be possible to install three feature points or more.

Hereinafter various modified examples of the method of detecting a position of a dish storage basket (e.g., lower basket) inside the washing tub 103 including an upper portion of the door 104, in a state in which the feature point corresponding to an indicator is not installed in the dish storage basket, will be described.

Firstly, on a wall surface (door-facing surface) facing the door 104 in the washing tub 103, a time of flight (TOF) sensor is disposed. A reflection plate reflecting light emitted from the TOF sensor is installed on a portion opposite to the washing tub 103, in the lower basket 107. By measuring a distance to the reflection plate through the TOF sensor, it may be possible to calculate a withdrawal amount of the lower basket 107 that is taken out from the washing tub 103, i.e., the position of the lower basket 107.

In contrast, the TOF sensor may be installed on the opposite portion to the washing tub 103 in the lower basket 107 and the reflection plate may be installed on the door-facing surface of the washing tub 103. In this case, through a wire, a wireless or a battery, the power is supplied to the TOF sensor installed on the lower basket 107. When employing the power supply method by the wire or the wireless, a communication means is required.

Secondly, a winding machine is installed on the door-facing surface of the washing tub 103. Other end of a string, in which a force is applied to be wound around the winding machine, may be connected to the lower basket 107. For example, it is possible to calculate a position of the lower basket 107, i.e., a withdrawal amount of the lower basket 107 from the washing tub 103, based on a withdrawal amount of the string by measuring the number of the revolutions of the winding machine.

Alternatively, in order to measure the withdrawal amount of the string, a configuration, in which a graduation is provided on the string and to read the graduation through an image processing sensor, may be used instead of the configuration using the revolutions of the winding machine.

Thirdly, when a wheel is provided in a bottom portion of the lower basket 107, it is possible to install a tachometer (revolution sensor) to the wheel. It is possible to calculate the withdrawal amount of the lower basket 107 from the washing tub 103, based on the revolutions. In addition, the power may be supplied to the tachometer through a wire, a wireless or a battery, and the result of calculation may be notified to the dishwasher 101 through the wire or the wireless communication.

Fourthly, a plurality of weight sensors may be provided on an entire travel area of the lower basket 107 in an inner surface of the door 104 (an upper surface when the door is open). In this case, the position of the weight sensor which senses the weight at the position farthest from the washing tub 103 may be calculated as the withdrawal amount of the lower baskets 107 from the washing tub 103.

Fifthly, a plurality of switches may be provided on an entire travel area of the lower basket 107 in an inner surface of the door 104 (an upper surface when the door is open). For example, a switch may be conducted upon being pressed by a bottom contact portion of the lower basket 107 (including the wheel). In this case, a position of the switch which is conductive at the position farthest from the washing tub 103 may be calculated as the withdrawal amount of the lower basket 107 from the washing tub 103.

Sixthly, through the image recognition, the user hand (finger) is detected from an image of a position where a user holds the lower basket 107 and a position where a user places the lower basket 107, and it is possible to calculate a withdrawal amount of the basket 107 from the washing tub 103, based on the distance therebetween.

Seventhly, the wire frame of the lower basket 107 is detected from a captured image through image recognition and it is possible to calculate a withdrawal amount of the basket 107 from the washing tub 103 based on the detected position of the wire frame. In this case, the lower basket 107 may select any part such as the surrounding wall 107*c* in the door 104 side in the lower basket 107 or the surrounding wall 107*c* in the door-facing surface side of the washing tub 103 in the lower basket 107.

Third Embodiment

Hereinafter a third embodiment of the present disclosure will be described.

Figure 9:
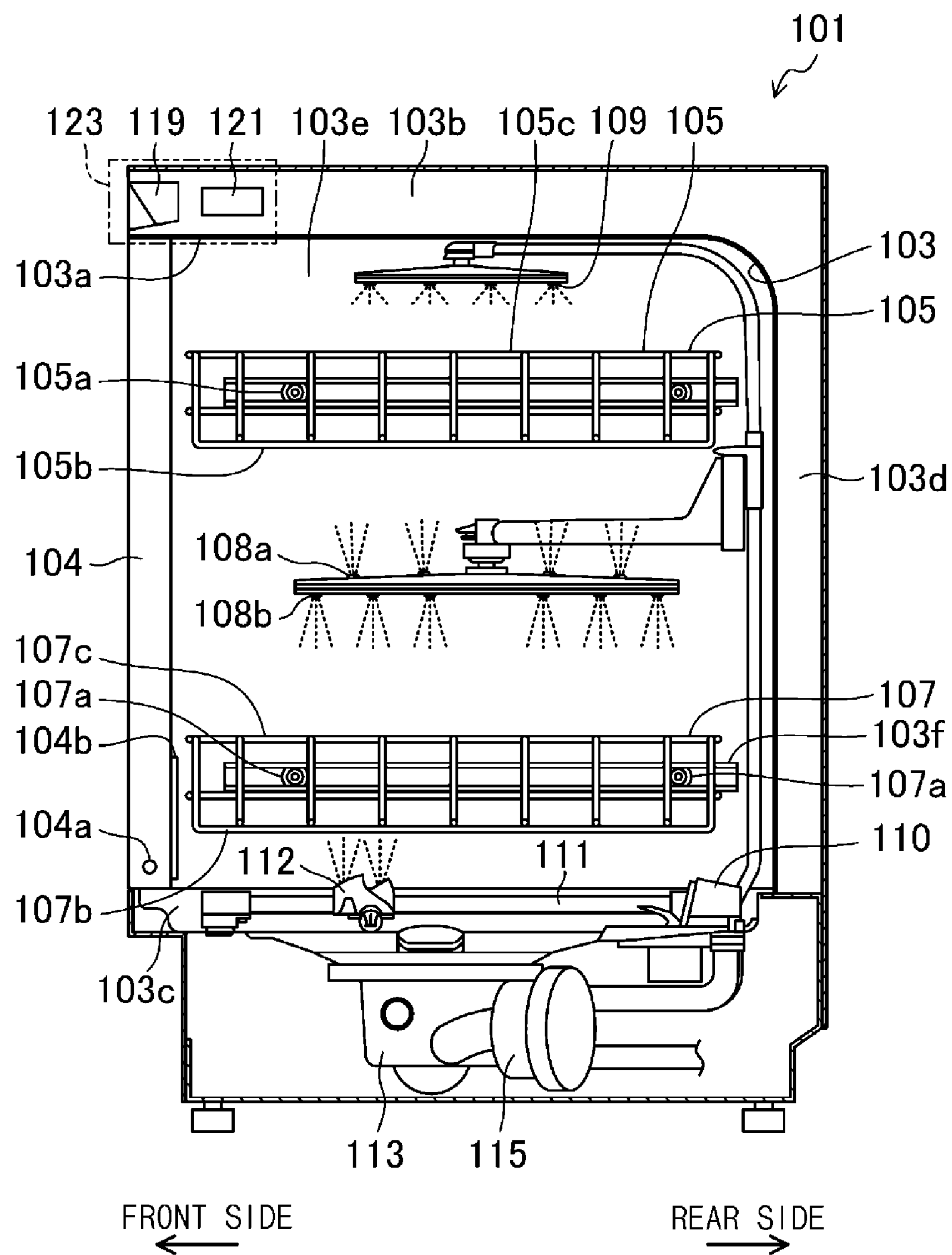
FIG. 9 is a cross-sectional view of a dishwasher provided with a stored object detector according to a third embodiment of the present disclosure, when a door is closed.
Figure 10:
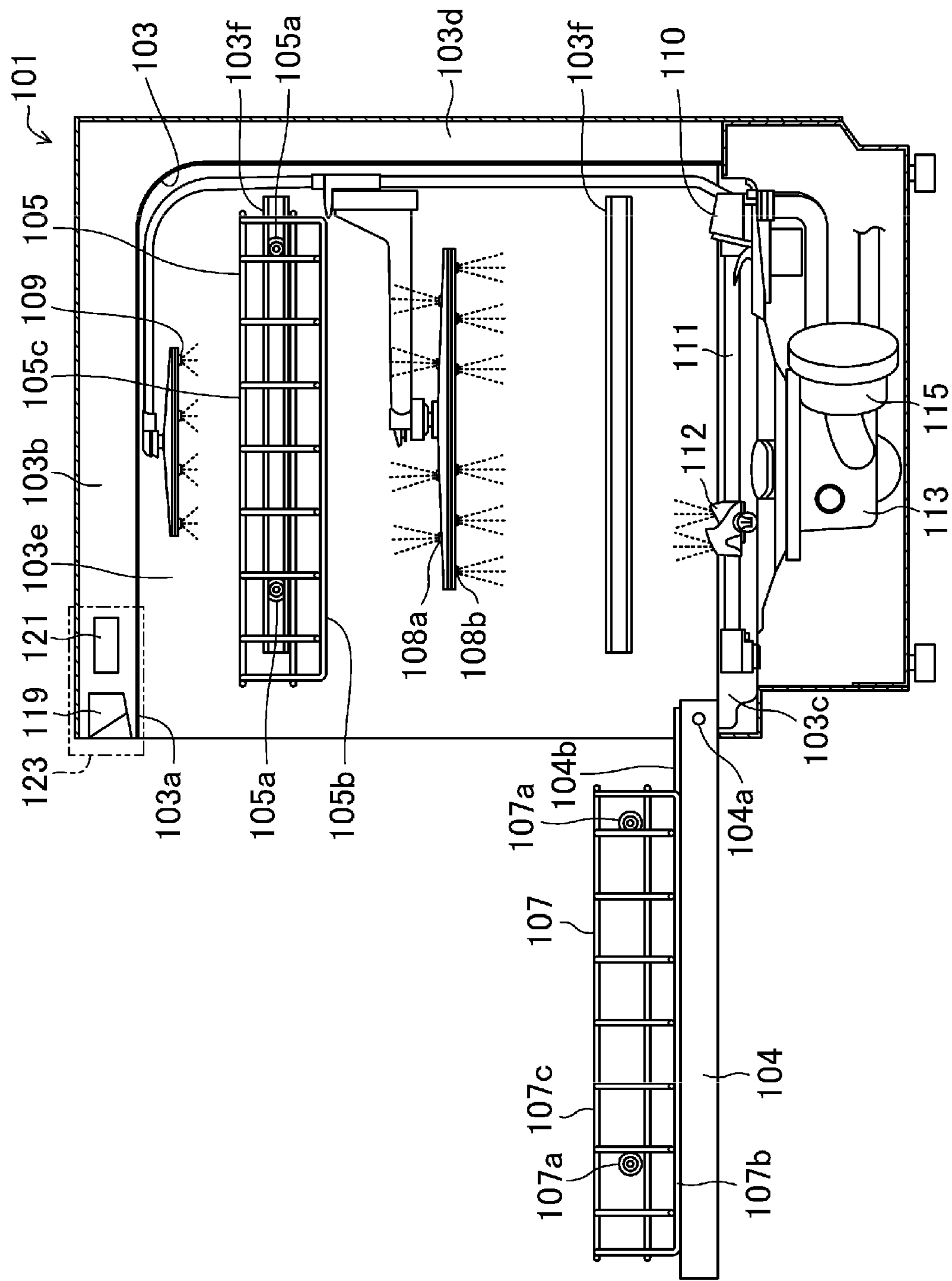
FIG. 10 is a view showing a state in which the entire lower basket is taken out by opening the door of FIG. 9.
Figure 11:
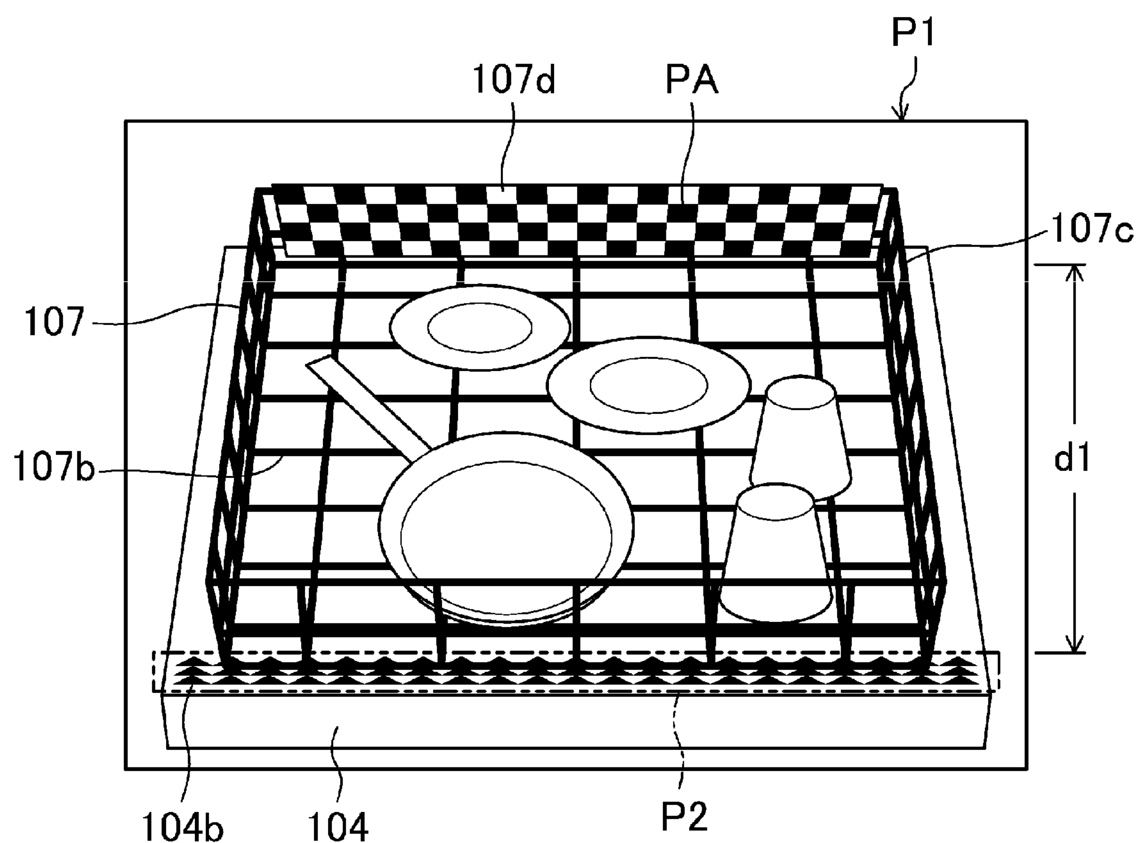
FIG. 11 is a view showing an image captured when the entire lower basket is taken out by opening the door.
Figure 12:
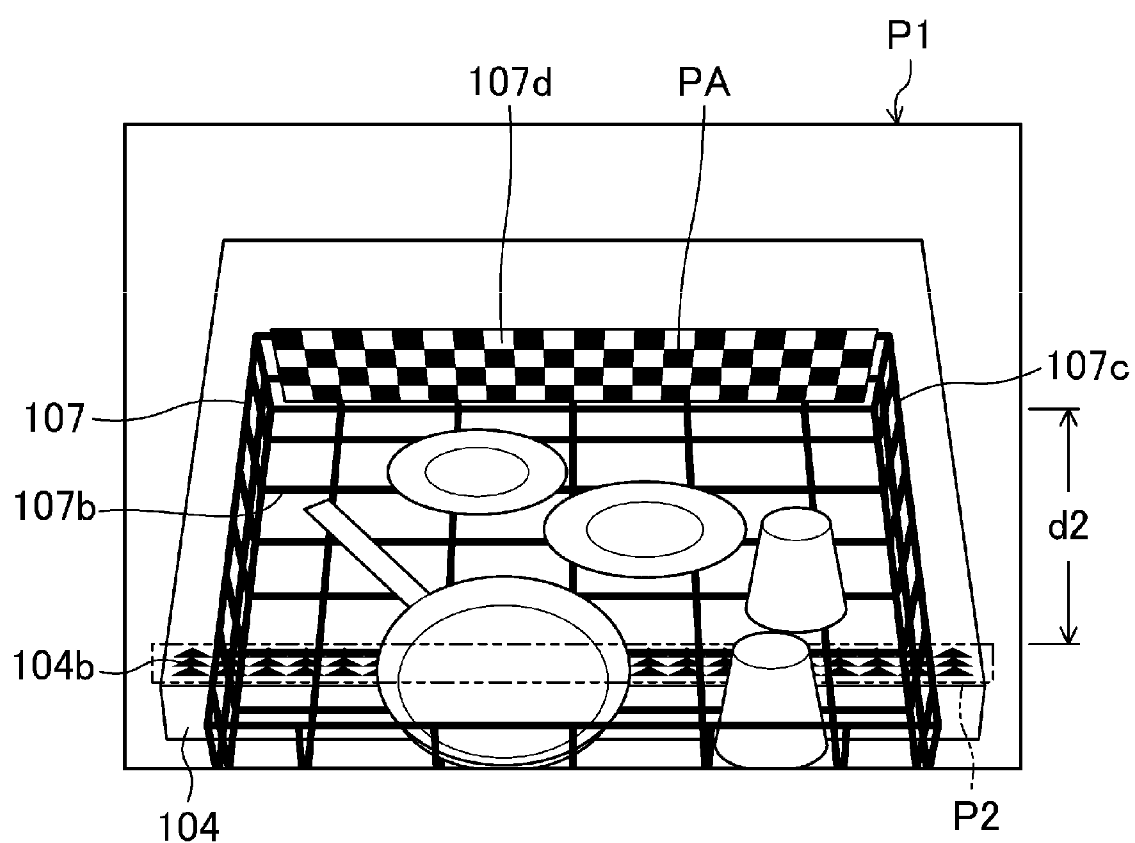
FIG. 12 is a view showing a state in which a part of the lower basket is taken out by opening the door of FIG. 11.

FIG. 9 is a cross-sectional view of a dishwasher provided with a stored object detector according to a third embodiment of the present disclosure, when a door is closed, FIG. 10 is a view showing a state in which the entire lower basket is taken out by opening the door of FIG. 9, FIG. 11 is a view showing an image captured when the entire lower basket is taken out by opening the door, and FIG. 12 is a view showing a state in which a part of the lower basket is taken out by opening the door of FIG. 11.

In FIGS. 9 and 10, the same reference numerals and the same name will be used for the same components as the components of FIG. 2.

FIG. 9, FIG. 10 and FIG. 2 show a dish washer 101.

Hereinafter a withdrawal direction of the dishwasher 101 is referred to as the front side. When viewing from a plan on the front end portion, the dishwasher 101 is provided with a washing tub 103 corresponding to a storage portion that has a cuboid shape forming a box-shape having a rectangular shape opening 103*a*.

The washing tub 103 includes an upper surface 103*b*, a bottom surface 103*c*, a rear surface 103*d* opposite to the opening 103*a*, and a pair of lateral surfaces 103*e* opposite to each other with respect to the opening 103*a* in a horizontal direction. In a lower edge portion of the opening 103*a* of the washing tub 103, a door 104, which has a rectangular and substantially plate shape when viewing from a sealable plane to the opening 103*a*, may be installed to be rotatable in the up and down direction by connecting its longitudinal end portion to a hinge portion 104*a*. A back surface of the door 104 is made of stainless steel.

As illustrated in FIGS. 11 and 12, in the vicinity of the end portion of the hinge (rotary shaft) 104*a* side on the back surface of the door 104, a recognition mark 104*b* is attached to be extended in the opposite direction of the lateral surface 103*e*.

According to the third embodiment, the recognition mark 104*b* has a pattern in which a solid triangle, in which any color is tightly painted, is stacked as three layers and then arranged in the opposite direction of the lateral surface 103*e*. Each of the apexes of the plurality of triangles faces the end of the lateral side of the hinge (rotary shaft) 104*a*. The recognition mark 104*b* is not limited to a pattern in which figures are combined, but may be composed of characters (Chinese character, hiragana, katakana, or various alphabet letters), symbols, color saturation or brightness, or combinations thereof.

On an inner surface of the both lateral surfaces 103*e* of the washing tub 103, a pair of guide rail 103*f* extended in the opening direction of the opening 103*a* (withdrawal direction) is installed at an interval in the vertical direction. An upper basket 105 is provided to be slidable in the front and rear direction on both upper guide rails 103*f*. Wheels 105*a* are provided on both sides of the upper basket 105 in the opposite direction of the lateral surfaces 103*e*, and the wheels 105*a* is rotatably coupled to the guide rail 103*f* In the same manner, the upper basket 107 corresponding to the storage portion is provided to be slidable in the front and rear direction on both upper guide rails 103*f* Wheels 107*a* are provided on both sides of the lower basket 107 in the opposite direction of the lateral surfaces 103*e*, and the wheels 107*a* is rotatably coupled to the guide rail 103*f*.

The upper basket 105 and lower basket 107 are provided with a rectangular bottom portion 105*b* and 107*b* and a rectangular-annular surrounding wall 105*c* and 107*c* protruded from the entire periphery of the bottom portion 105*b* and 107*b*, which are formed by intersecting linear metal materials.

As illustrated in FIGS. 11 and 12, a sheet 107*d* having one surface thereof on which an identification pattern PA corresponding to the indicator, such as a checkered pattern is attached is provided in the surrounding wall 107*c* in the front side (withdrawal side) of the lower basket 107, and particularly the sheet 107*d* is installed to allow the identification pattern PA side to be directed to the rear side (a direction opposite to the withdrawal direction). In addition, in the same manner as the recognition mark 104*b*, the identification pattern PA is not limited to a pattern in which figures are combined, but may be configured by characters, symbols, color saturation or brightness, or a combination thereof.

When a withdrawal width is the maximum, the entire of the upper basket 105 and lower basket 107 are taken out through the opening 103*a* and then are placed in a withdrawal position that is withdrawn to the outside of the washing tub 103. Meanwhile, when a withdrawal width is the minimum, the entire of the upper basket 105 and lower basket 107 are placed in an operation position placed in the outside of the washing tub 103.

Inside the washing tub 103, a plurality of lower rotatable nozzles 108*a* and 108*b* spraying water (washing water or rinsing water) to the upper and lower side, is provided between the operation position of the upper basket 105 and the operation position of the lower basket 107.

In the upper side of the operation position of the upper basket 105 inside the washing tub 103, a plurality of upper rotatable nozzles 109 spraying water to the lower side is rotatably disposed.

A hollow fixed nozzle 110 extended in the opposite direction of the both lateral surfaces 103*e* is disposed in the bottom of the washing tub 103, i.e., in the vicinity of the lower end portion of the operation position of the lower basket 107. In the fixed nozzle 110, a plurality of injection holes (not shown) spraying water horizontally to the front side is disposed at an interval in the longitudinal direction of the fixed nozzle 110.

A support rail 111 extended in the front and rear direction is disposed at an approximately central portion of the opposite direction of the both lateral surfaces 103*e* in the bottom of the washing tub 103, i.e., the lower side of the operation position of the lower basket 107. The support rail 111 slidably supports a slide member 112 having a long shape extending in the opposite direction of the both lateral surfaces 103*e*, from the lower side.

On the slide member 112, a collision surface (not shown) on which water sprayed from the fixed nozzle 110 collides to change a traveling direction of the water upward, is formed. Although not shown, the slide member 112 is connected to a belt, and when a pulley in the rear side is rotated by an operation of the motor, the belt moves and then the slide member 112 is slide along the support rail 111. Therefore, the driving mechanism is composed of the belt, the pulley and the motor.

An outlet (not shown) is disposed in the bottom surface 103*c* of the washing tub 103. In the lower side of the outlet, a tank 113 storing water discharged from the inside of the washing tub 103 through the outlet and a pump 115 circulating the water stored in the tank 113 by pressing the water to the lower rotatable nozzle 108*a* and 108*b*, the upper rotatable nozzle 109, and the fixed nozzle 110 are provided.

As mentioned above, when water is sprayed horizontally forward from each injection hole of the fixed nozzle 110 by driving the pump 115 of the dishwasher 101 configured as described above, the water sprayed from the fixed nozzle 110 collides with the collision surface of the slide member 112 and is scattered upward to wash the dishware placed in the lower basket 107. At this time, when the motor is operated in a state in which the injection of water of the fixed nozzle 110 is continued, the slide member 112 slides in the front and rear direction along the support rail 111, and thus the water is evenly distributed to the upper space of the slide range of the slide member 112.

At the central portion of the opposite direction of the both lateral surfaces 103*e* in the upper peripheral edge of the opening 103*a* of the washing tub 103, i.e., the cross section of the front side of the upper surface 103*b*, the visible camera 119 corresponding to the imaging portion is disposed to be inclined downward the opening direction of the opening 103*a*. The position and direction of the visible camera 119 is set to capture an image of the entire of the lower basket 107 placed in the withdrawal position and the tableware stored in the lower basket 107. Particularly, the lens of the visible camera 119 is disposed to be directed to the outside of the washing tub 103.

A microcomputer 121 corresponding to control means is embedded in the slightly rear side than the visible camera 119 on the upper surface 103*b* of the washing tub 103. The microcomputer 121 acquires the storage information including at least one of the position, the size and the quantity of the tableware in the lower basket 107 based on the image P1 captured by the visible light camera 119.

The stored object detector 123 according to the third embodiment is configured with the visible camera 119 and the microcomputer 121.

In the dishwasher 101 configured as described above, in the process in which the lower basket 107 is pushed from the state of being withdrawn to the front side of the washing tub 103, to the operation position, it is possible to acquire the storage information including at least one of the position, the size, and the quantity of the tableware of the lower basket 107. This will be described with reference to FIG. 13.

Figure 13:
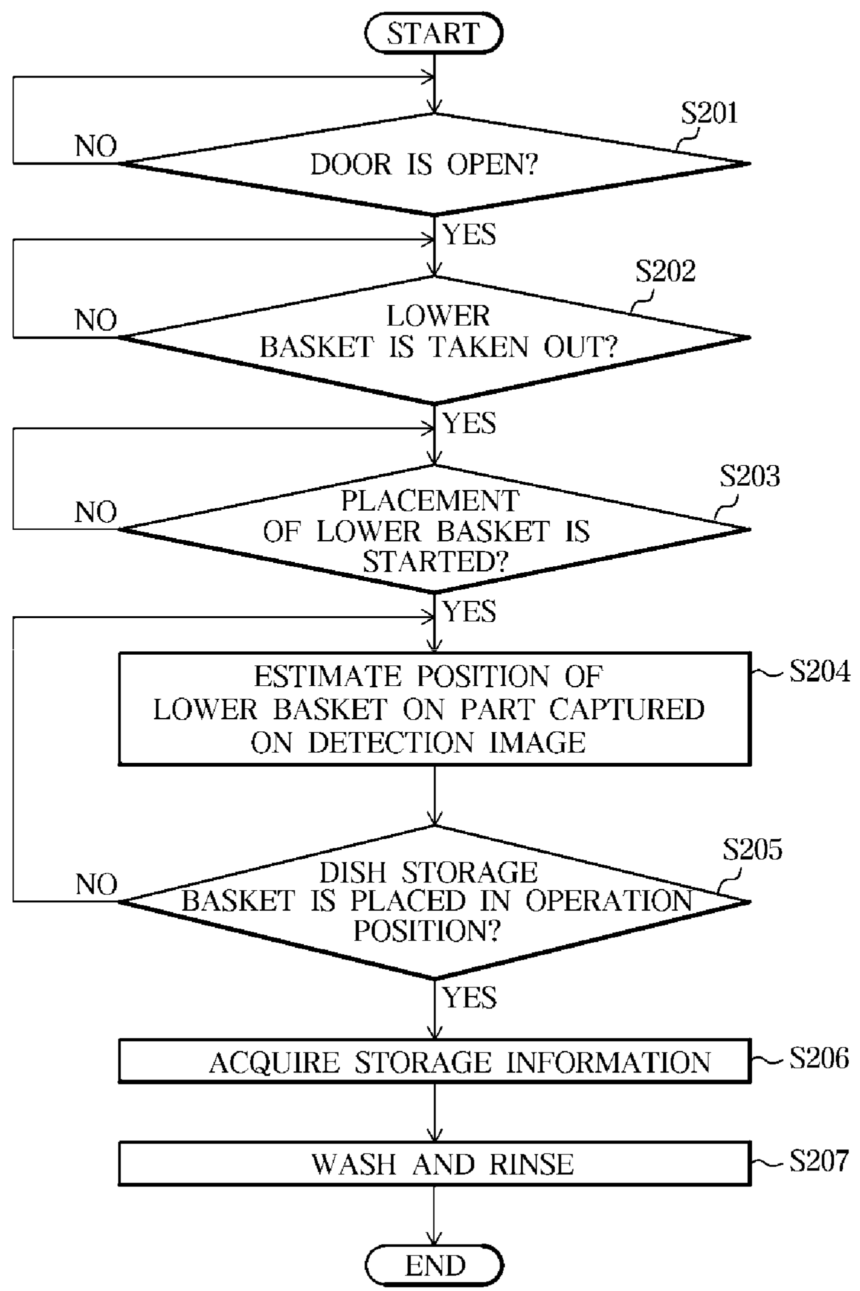
FIG. 13 is a flowchart showing an operation of the dishwasher provided with the basket position estimating apparatus according to the third embodiment.

FIG. 13 is a flowchart showing an operation of the dishwasher provided with the basket position estimating apparatus according to the third embodiment.

When the power is supplied to the dishwasher 101, the visible camera 119 may start to acquire an image at a speed of 10 sheets per one second. In step 201, the microcomputer 121 continues to monitor until the door 104 is opened. When the door 104 is opened, the microcomputer 121 proceeds to step 202 to wait until the lower basket 107 is taken out of the washing tub 103.

When the lower basket 107 is taken out of the washing tub 103, the microcomputer 121 proceeds to step 203, and waits until the dishes are placed in a proper position of the lower basket 107 and the movement for placing the lower basket 107 to the washing tub 103 starts.

In step 203, when the microcomputer 121 recognizes the movement of the lower basket 107, the microcomputer 121 proceeds to next step 204, detects the identification pattern PA attached to the lower basket 107 based on each image P1 captured by the visible camera 119, and specifies a position of a part, which is captured on a certain detection image P2 forming a portion of the captured image P1, in the lower basket 107, based on the position of the identification pattern PA in each captured image P1. The detection image P2 is a certain area of the captured image P1 and thus it is possible to acquire information indicating a position of the lower basket 107 such as the withdrawal amount of the lower basket 107 upon capturing the image P1, as information indicating a position of a part captured on the detection image P2, in the lower basket 107. According to the third embodiment, the detection of the identification pattern PA is performed based on figures contained in the identification pattern PA.

Alternatively, according to types of identification pattern PA, the detection of the identification pattern PA may be performed based on the external shape and color of the identification pattern PA or characters contained in the identification pattern PA. In addition, the detection of the identification pattern PA may be performed based on a plurality of conditions among the external shape and color of the identification pattern PA or characters and figures contained in the identification pattern PA. As illustrated with a virtual line of FIGS. 11 and 12, the detection image P2 is a portion on which the recognition mark 104*b* is captured, and forms the vicinity of the edge of the lateral end portion of the washing tub 103 of the image P1. Particularly, the detection image P2 is set to be contained in a part placed in the most adjacent to the washing tub 103 when dividing the captured image P1 with four portions in the withdrawal direction. For example, based on the captured image P1 of FIG. 12, a position of a part, captured on the detection image P2, in the lower basket 107 is specified as a position that is placed in the rear side by a distance corresponding to d1 than the sheet 107*d* (identification pattern PA).

Based on the captured image P1 of FIG. 12, a position of a part captured on the detection image P2, in the lower basket 107 is specified as a position that is in the rear side by a distance corresponding to d2, than the sheet 107*d* (identification pattern PA). A distance between the part captured on detection image P2 and the sheet 107*d* is acquired by correcting a distance in the captured image P1, with the position and angle of the visible camera 119.

The microcomputer 121 memories the detection image P2 in correspondence with the position of the part on the detection image P2, in the lower basket 107. When the common detection image P2 in correspondence with the position is already memorized, the detection image P2 that is newly acquired covers thereon.

Step 204 is repeated until the lower basket 107 is placed in the operation position of the washing tub 103. That is, the microcomputer 121 repeats step 204 for a plurality of captured images P1 in which the positions of the lower baskets 107 are different.

When the lower basket 107 is placed in the predetermined operation position in step 205, the microcomputer 121 proceeds to step 206.

In step 206, the microcomputer 121 specifies an area in which the recognition mark 104*b* is not identified in each of the detection images P2 stored in step 204, as a placement area of tableware. The microcomputer 121 is configured to acquire storage information including at least one of the position, size and quantity of the tableware in the lower basket 107, based on the tableware placement area of the plurality of detection images P2 and the position of the part captured on each detection image P2, in the lower basket 107 (it is specified in step 204). In addition, when the detection image P2 of a partial area of the lower baskets 107 cannot be obtained in step 204 due to some circumstances, the microcomputer 121 may estimate the position, size and quantity of the tableware, which is not acquired based on the detection image P2, based on the tableware placement area of the acquired detection image P2. In addition, the microcomputer 121 may specify the color, the type, and the material of the tableware stored in the lower basket 107.

In step 207, by controlling the driving mechanism based on the storage information acquired in step 206, the microcomputer 121 controls the position of the slide member 112 when the fixed nozzle 110 sprays water during washing and rinsing. For example, the microcomputer 121 may effectively wash the tableware by allowing the slide member 112 to be located under the tableware placement area for a longer time than under an area in which the tableware is not placed. Therefore, it is possible to reduce a washing time.

According to the third embodiment, since it is possible to specify the position of the part captured on the detection image P2, in the lower basket 107 although the number of indicator is small, it is possible to limit the location of the identification pattern PA for detection, to only one part of the lower basket 107. Therefore, in comparison with the patent document 1 in which an indicator is installed on each area, the number of indicator is smaller and thus the appearance of the lower basket 107 is better.

In addition, it is possible to high-precisely specify the position of the part captured on the detection image P2, in the lower basket 107 although the placement location of the identification pattern PA is a single one part. Therefore, it is possible to increase the accuracy of the storage information without deteriorating the appearance of the lower basket 107.

In addition, since the detection image P2 is a part of the captured image P1, it is possible to reduce influence of deviations of the amount of incident light and incident angle in the entire captured image P1 and to increase the reliability of the acquired storage information, in comparison with a case in which the detection image P2 is the entire of the captured image P1.

Since a part, in which the vicinity of the visible camera 119 is captured, of the captured image P1 is used as the detection image P2, it is possible to prevent tableware, which is stored in a part corresponding to the detection image P2, from being not captured on the detection image P2 by other tableware. Therefore, it is possible to increase the reliability of the acquired storage information.

Since the storage information is acquired based on the captured image P1 of the part of the lower basket 107 that is taken out of the washing tub 103, the lens of the visible camera 119 is placed to be directed to the outside the washing tub 103 and thus it is possible to prevent water, vapor and detergent in the washing tub 103 from exerting a bad influence on the lens.

Fourth Embodiment

Hereinafter a fourth embodiment of the present disclosure will be described.

Figure 14:
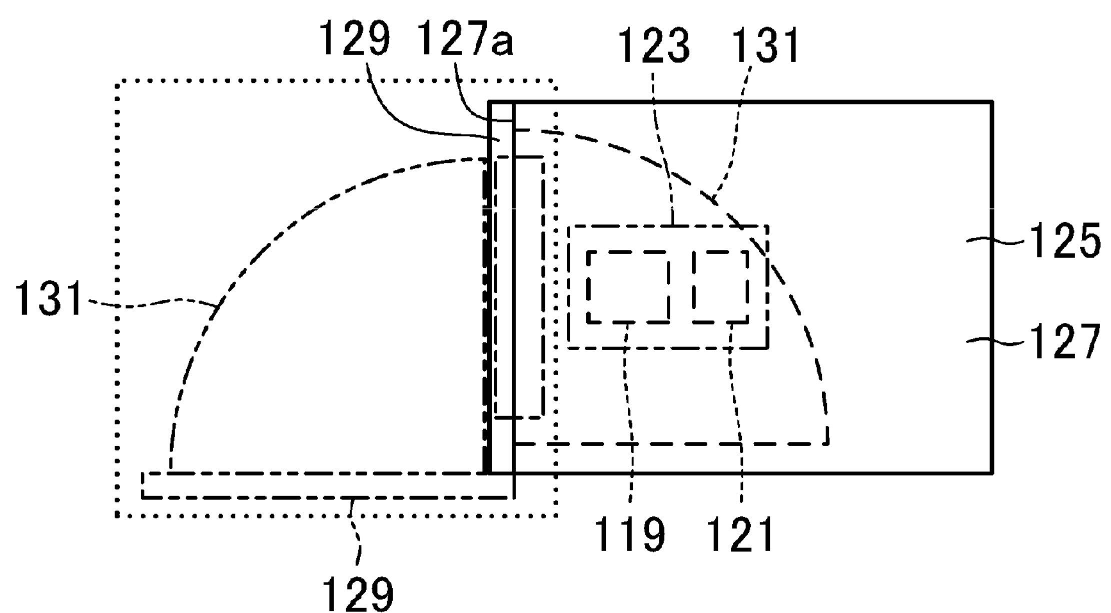
FIG. 14 is a schematic plan view of a storage provided with a stored object detector according to a fourth embodiment of the present disclosure.

FIG. 14 is a schematic plan view of a storage provided with a stored object detector according to a fourth embodiment of the present disclosure, and shows a storage 125 provided in a stored object detector 123.

In FIG. 14, when viewing from a plan on the front end portion, the storage 125 is provided with a storage body 127 corresponding to a storage portion that has an approximate cuboid shape forming a box-shape having a rectangular shape opening 127*a*.

In the left side edge portion (an edge portion of the lower side) of the opening 127*a* of the storage body 127, a door 129 is rotatably connected in the left and right direction through a hinge (not shown), which is illustrated as a two-dot-chain line, to open and close the opening 127*a*.

On the back surface of the door 129, a rotary tray 131 accommodated in the storage body 127 is installed such that a storage surface in which stored objects are stored, is directed to the upper side.

Therefore, the door 129 and the rotary tray 131 form the storage portion.

In addition, the visible camera 119 is disposed to capture the entire movement range of the door 129, and the detection image P2 is set to a part in which a circumstance of the opening 127*a* of the storage body 127 (a part surrounded by the dash-dot line in FIG. 14) is captured in the captured image P1 (an image that is captured of a part surrounded by the dot line in FIG. 14). The microcomputer 121 detects the door 129 from the captured image P1 and specifies a position of a part captured on the detection image P2, in the rotary tray 131. The microcomputer 121 acquires storage information including at least one of the position, size and quantity of the stored object, based on the position of the stored object on the detection image P2 and the position of the part captured on the detection image P2, in the rotary tray 131.

Since the other structures and operations are the same as those of the third embodiment, a detailed description thereof will be omitted.

As described above, according to the fourth embodiment, it is possible to improve the appearance of the door 129 and the rotary tray 131 in the same as the third embodiment.

Fifth Embodiment

Hereinafter a fifth embodiment of the present disclosure will be described.

Figure 15:
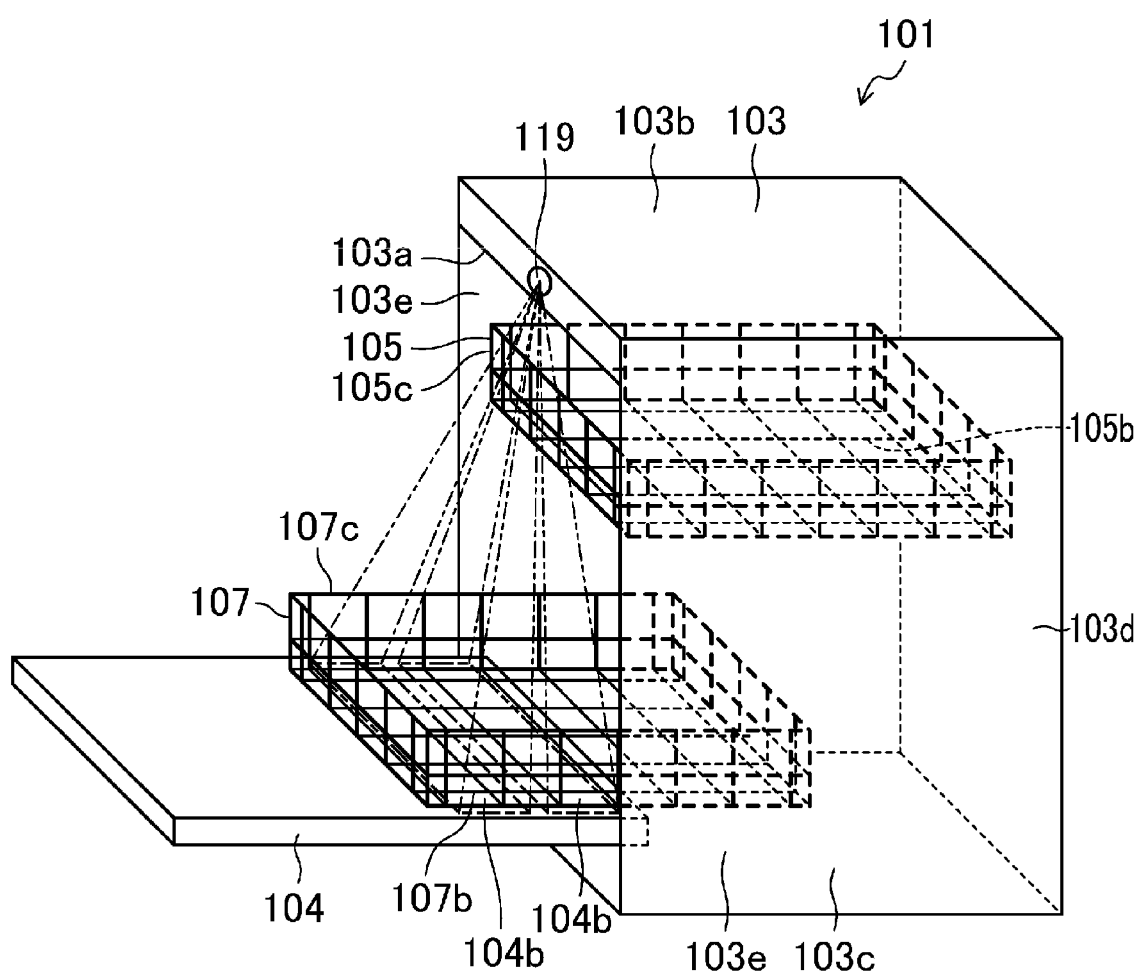
FIG. 15 is a view of a dishwasher according to a fifth embodiment of the present disclosure, which corresponds to FIG. 2.

FIG. 15 shows a dishwasher 101 provided with a stored object detector 123 according to a fifth embodiment of the present disclosure, which corresponds to FIG. 2.

In FIG. 15, a recognition mark 104*b* is attached to two areas spaced apart in the withdrawal direction on the back surface of the door 104.

In step 204 of FIG. 13, the microcomputer 121 specifies a position of a part in the lower basket 107, wherein the part is captured on two detection images P2 forming a part corresponding to each recognition mark 104*b* of the captured image P1, i.e., two detection images P2 forming a different part of the captured image P1.

In addition, in step 206 of FIG. 13, the above mentioned storage information is acquired based on the tableware placement area of two detection images P2 and a position that is specified in step 204, about the detection image P2. The two detection images P2 forming a different part of the captured image P1 is similar with two images from other viewpoint, and thus these two detection images P2 are regarded as images from different viewpoints. Accordingly, three-dimensional information such as the height, the direction and the sharpness of the tableware may be contained in the storage information.

Other structures and operations are the same as those of the third embodiment, and a detailed description thereof will be omitted.

As described above, according to the fifth embodiment, although a plurality of visible cameras 119 is not installed, it is possible to acquire the 3D information of the tableware. Therefore, it is possible to reduce the number of component and the manufacturing cost in comparison with the case of installing the plurality of visible cameras 119.

Sixth Embodiment

Hereinafter a sixth embodiment of the present disclosure will be described.

Figure 16:
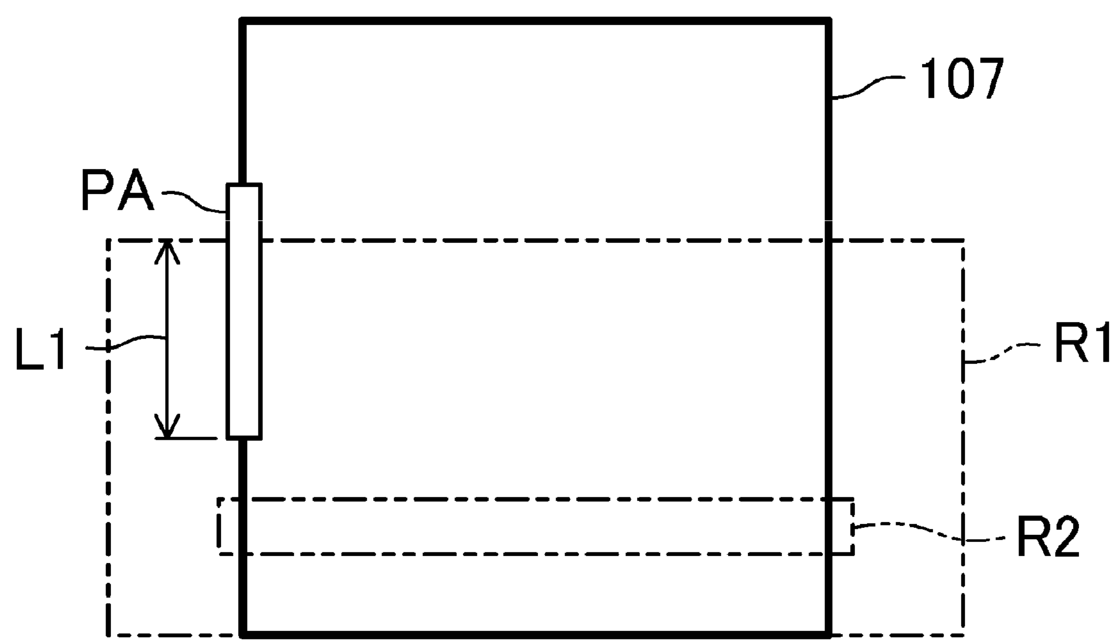
FIG. 16 is a view showing an area captured on an image by a stored object detector according to a sixth embodiment of the present disclosure, when the entire lower basket is taken out.
Figure 17:
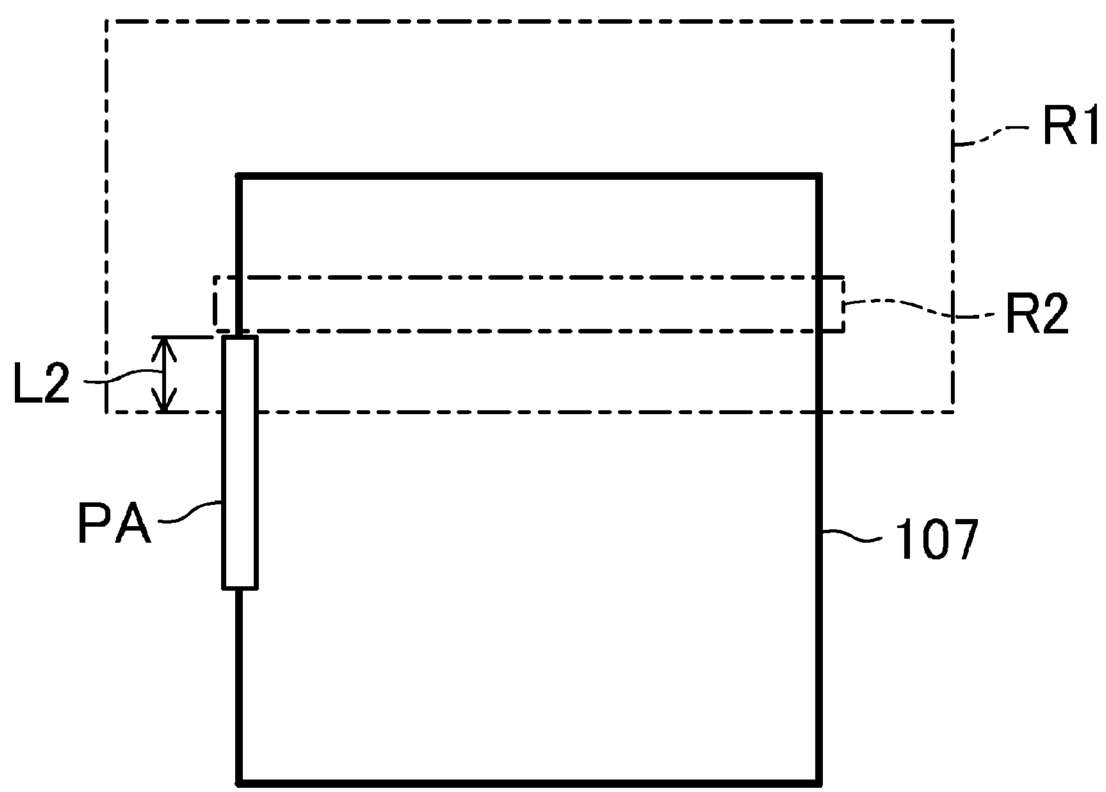
FIG. 17 is a view showing a state in which a part of the lower basket is taken out with respect to FIG. 16.

FIG. 16 is a view showing an area captured on an image by a stored object detector according to a sixth embodiment of the present disclosure, when the entire lower basket is taken out, and FIG. 17 is a view showing a state in which a part of the lower basket is taken out with respect to FIG. 16.

In the dishwasher 101 provided with the stored object detector 123 according to the sixth embodiment, a color, which is different from other part in one end portion in the left and right direction of the lower basket 107, is applied to a line extended in the front and rear direction (the withdrawal direction) and thus the painted part forms the identification pattern PA, as an indicator.

In step 204 of FIG. 13, based on whether the identification pattern PA is captured on the upper end portion or the lower end portion of each captured image P1 (i.e., the position of the identification pattern PA) and a length (amount) of identification pattern PA on each captured image P1, the microcomputer 121 specifies a position of a part, which is captured on the detection image P2, in the lower basket 107.

When an area captured on the captured image P1 is referred to as R1 and an area captured on the detection image P2 is referred to as R2 in FIGS. 16 and 17, the identification pattern PA is captured on the upper end portion of the captured image P1, and the length of the identification pattern PA of the captured image P1 is a length corresponding to L1 in FIG. 16. In addition, the identification pattern PA is captured on the lower end portion of the captured image P1, and the length of the identification pattern PA of the captured image P1 is a length corresponding to L2 in FIG. 17.

Other structures and operations are the same as those of the third embodiment, a detailed description thereof will be omitted.

Seventh Embodiment

Hereinafter a seventh embodiment of the present disclosure will be described.

Figure 18:
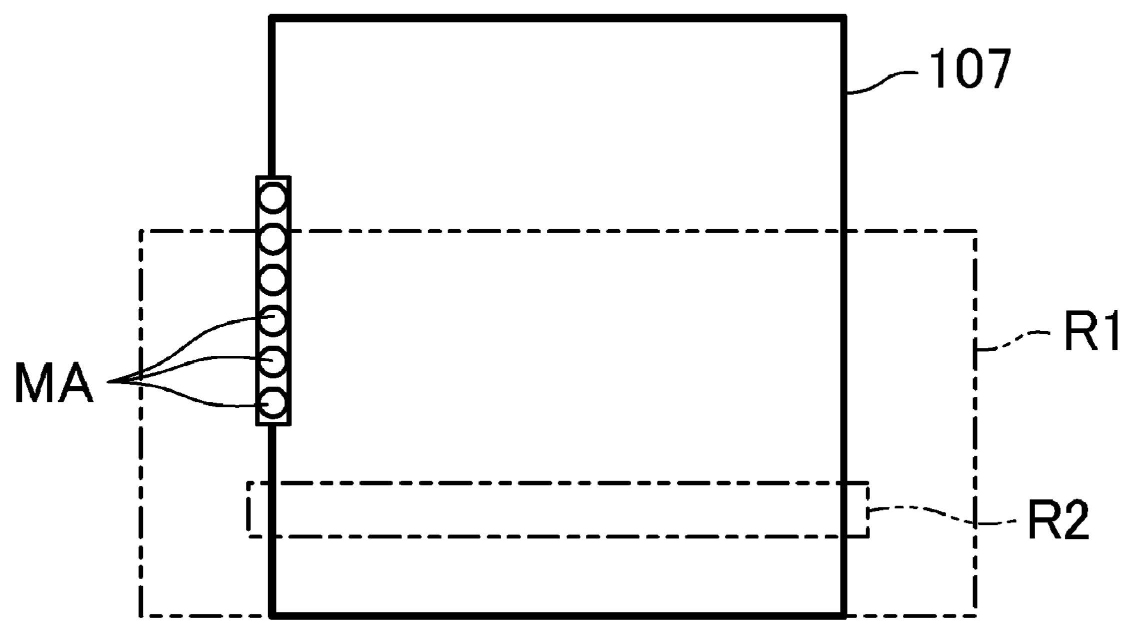
FIG. 18 is a view showing an area captured on an image by a stored object detector according to a seventh embodiment of the present disclosure, when the entire lower basket is taken out.
Figure 19:
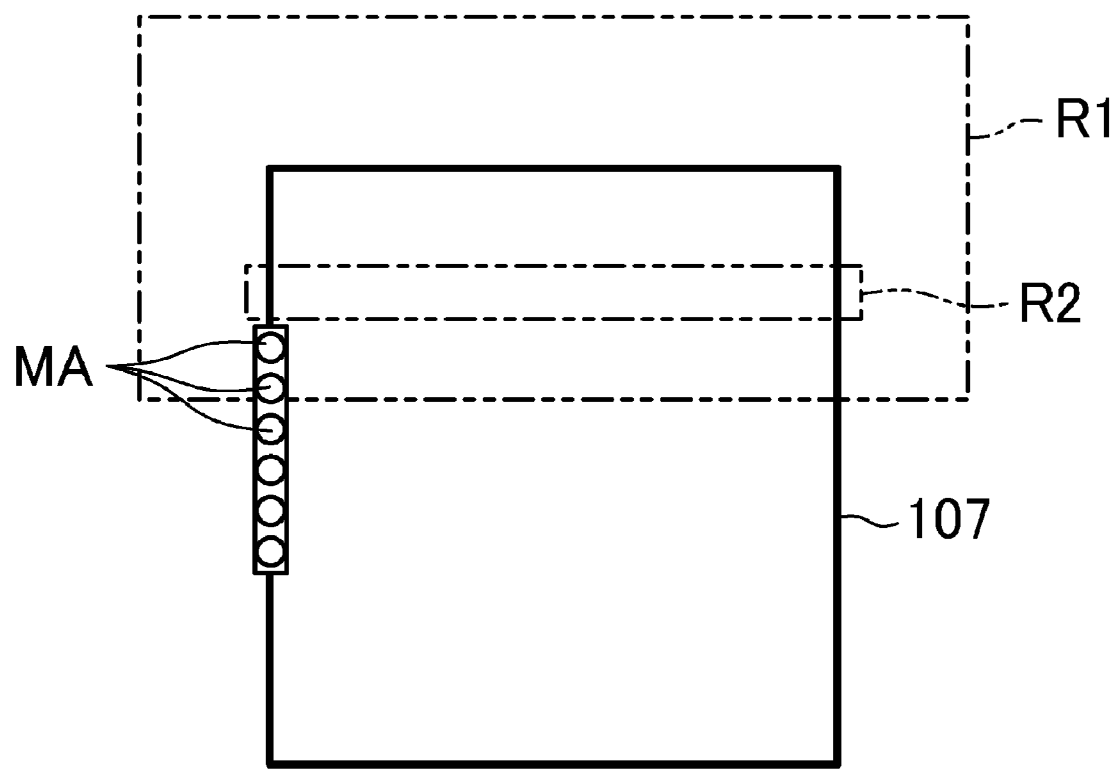
FIG. 19 is a view showing a state in which a part of the lower basket is taken out with respect to FIG. 18.

FIG. 18 is a view showing an area captured on an image by a stored object detector according to a seventh embodiment of the present disclosure, when the entire lower basket is taken out, and FIG. 19 is a view showing a state in which a part of the lower basket is taken out with respect to FIG. 18.

In a dishwasher 101 provided with a stored object detector 123 according to the seventh embodiment, a mark MA corresponding to a plurality of indicators is attached in one end portion of the left and right direction of the lower basket 107 at equal intervals in the front and rear direction (withdrawal direction).

In step 204 of FIG. 13, based on whether the mark MA is captured on the upper end portion or the lower end portion of each captured image P1 (i.e., the position of the mark MA) and the number of marks MA captured on each captured image P1, the microcomputer 121 specifies a position of a part, which is captured on the detection image P2, in the lower basket 107.

When an area captured on the captured image P1 is referred to as R1 and an area captured on the detection image P2 is referred to as R2 in FIGS. 18 and 19, the mark MA is captured on the upper end portion of the captured image P1, and the number of the mark MA of the captured image P1 is five in FIG. 18. In addition, the mark MA is captured on the lower end portion of the captured image P1, and the number of the mark MA of the captured image P1 is two in FIG. 19.

Other structures and operations are the same as those of the third embodiment, a detailed description thereof will be omitted.

Two detection images P2 forming a different part of the capture image P1 is used according to the fifth embodiment, but it is possible to use three or more detection images P2 forming a different part of the capture image P1.

According to the above mentioned third and fifth embodiment, the identification pattern PA of the lower basket 107 is used as an indicator, but when a handle is installed in the lower basket 107 to allow a user to hold for moving the lower basket 107, the handle may be used as an indicator. Accordingly, it is not required to separately install an indicator for detection, and thus it is possible to improve the appearance of the lower basket 107.

According to the above mentioned third, and fifth to seventh embodiment, the visible camera 119 is installed on the upper side edge portion of the opening 103*a* of the washing tub 103, but the location of the visible camera 119 may vary as long as a location capable of capturing an indicator of the lower basket 107 and a location that is not affected by water, vapor and detergent inside the washing tub 103.

According to the above mentioned third to seventh embodiment, the detection image P2 is applied as a part of the captured image P1 but the detection image P2 is applied as the entire of the captured image P1.

According to the above mentioned third to seventh embodiment, the present disclosure may be applied to the dishwasher 101 or the storage 125. However, the present disclosure may be applicable to a desk or a warehouse accommodating a movable storage portion. In this case, the acquired storage information can be used for the inventory management or the management of valuables. Further, the present disclosure can be applied to a refrigerator having a drawer. In this case, the acquired storage information can be used for adjustment of cooling effect or food management.

Hereinafter various modified examples of the method of detecting a position of a storage basket, in a state in which the identification pattern PA is not installed in the storage basket (the lower basket 107), will be described.

Firstly, on a wall surface (door-facing surface) facing the door 104 in the washing tub 103, a time of flight (TOF) sensor is disposed. A reflection plate reflecting light emitted from the TOF sensor is installed on a portion opposite to the washing tub 103, in the lower basket 107. By measuring a distance to the reflection plate through the TOF sensor, it may be possible to calculate a withdrawal amount of the lower basket 107 that is taken out of the washing tub 103, i.e., the position of the lower basket 107.

Secondly, a winding machine is installed on the door-facing surface of the washing tub 103. Other end of a string, in which a force is applied to be wound around the winding machine, may be connected to the lower basket 107. For example, it is possible to calculate a position of the lower basket 107, i.e., a withdrawal amount of the lower basket 107 from the washing tub 103, based on a withdrawal amount of the string by measuring the number of the revolutions of the winding machine.

Alternatively, a configuration in which a graduation is provided on the string and to read the graduation through an image processing sensor, may be used.

Thirdly, on the approximately entire surface of the withdrawal direction of the bottom portion 107*b* of the lower basket 107, it is possible to form a plurality of areas, in which different colors are applied, to the withdrawal direction. For example, when the visible camera 119 captures an image of the lower basket 107, it is possible to estimate the withdrawal amount of the lower basket 107 from the washing tub 103 based on a captured position of a certain color area.

Fourthly, it is possible to use a plurality of different types of weaving direction or weaving method of the bottom portion 107*b* of the lower basket 107, which is identified by visible light, in the withdrawal direction. When the visible camera 119 captures an image of the lower basket 107, it is possible to estimate the withdrawal amount of the lower basket 107 from the washing tub 103 based a captured position of a certain area such as the weaving.

Fifthly, a plan shape (outer shape) of the lower basket 107 may have various shapes in the withdrawal direction. For example, since an area having a wave shape (concave-convex shape) and an area having a straight line shape are mixed when viewing from the plan surface, about the surrounding wall 107*c* of the lower basket 107 in the withdrawal direction, it is possible to estimate the withdrawal amount of the lower basket 107 from the washing tub 103 based on a captured position of the certain area.

Sixthly, a plurality of markers extended in the withdrawal direction may be provided in the bottom portion 107*b* of the lower basket 107. For example, the plurality of markers having an island shape may be arranged at intervals. When viewing from a plan view, the placement direction may be not limited to the direction parallel to the withdrawal direction, and may have a diagonal direction of the lower basket 107.

For example, when the visible camera 119 captures an image of the lower basket 107, it is possible to estimate the withdrawal amount of the lower basket 107 from the washing tub 103, based on the capturing position of the certain marker. The marker may have various plan shapes or colors thereof.

Hereinafter various modified examples of the method of detecting an object such as tableware in a rectangular detection image P2 corresponding to a captured area of the recognition mark 104*b*, will be described with reference to FIGS. 20 to 22.

Figure 20:
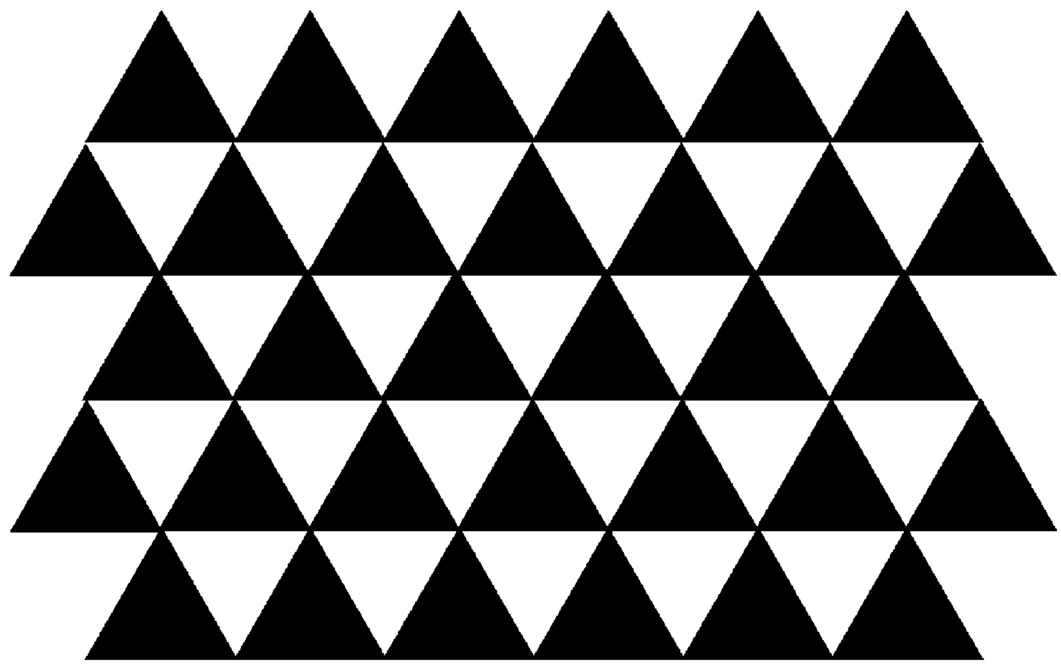
FIG. 20 is a plan view showing an example of a recognition mark.
Figure 21:
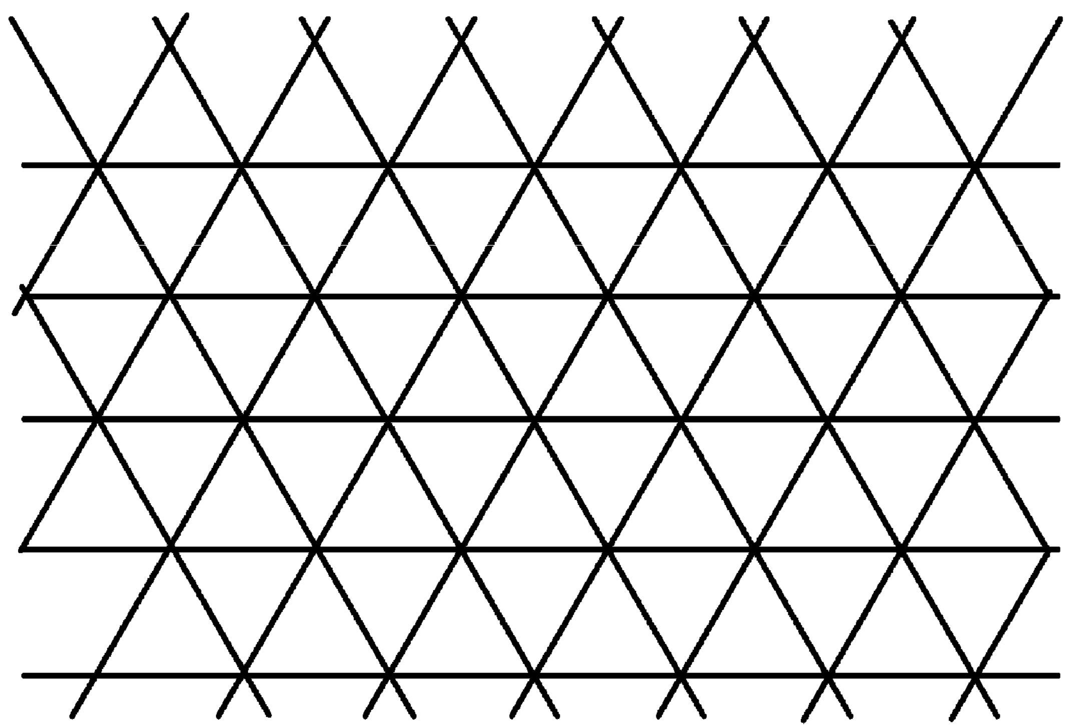
FIG. 21 is a virtual view of a linear component extracted from the recognition mark of FIG. 20.
Figure 22:
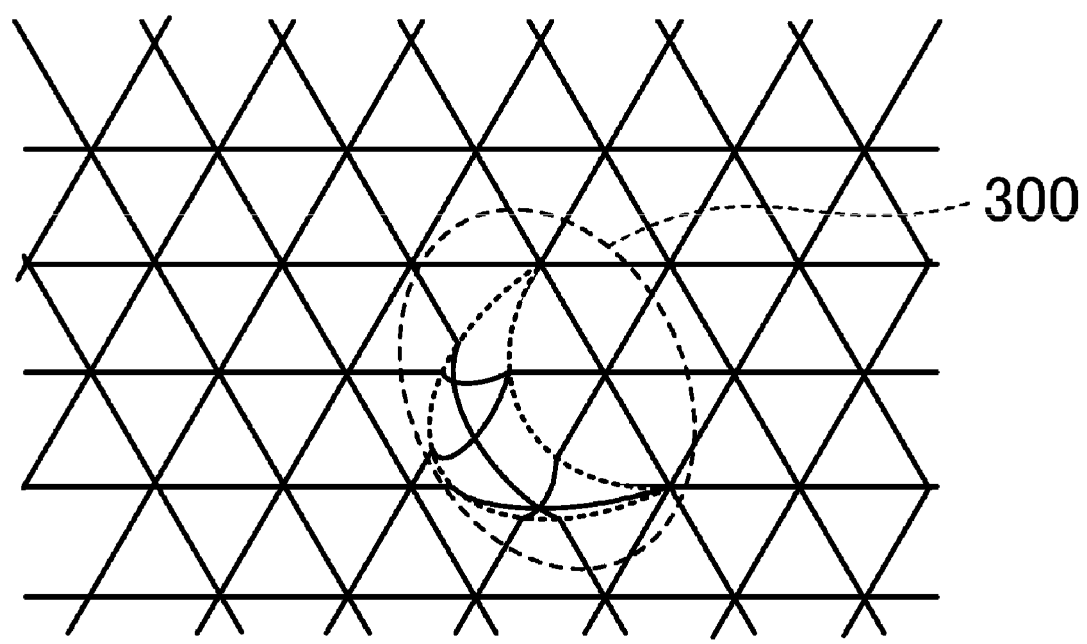
FIG. 22 is a virtual view of a linear component extracted from a recognition mark when a transparent dish is stored.

FIG. 20 is a plan view showing an example of a recognition mark, FIG. 21 is a virtual view of a linear component extracted from the recognition mark of FIG. 20, and FIG. 22 is a virtual view of a linear component extracted from a recognition mark when a transparent dish is stored.

Firstly, as the recognition mark 104*b*, a mark including a linear component may be used. In this case, a mark including a plurality of intersecting linear components may be used.

For example, as illustrated in FIG. 20, when a shape in which a plurality of triangles forms a regular hexagon, which is so-called "scale-shape", is used as the recognition mark 104*b*, it is possible to extract a linear component, as illustrated in FIG. 21, from the detection image of FIG. 20.

When the linear component is distorted in some area 300 in the captured area, as illustrated in FIG. 22, it is possible to detect or estimate that transparent dish is accommodated in the corresponding area 300.

Secondly, as well as installing the recognition mark 104*b* in the lower end portion of the door 104, it is possible to install the recognition mark 104*b* in the bottom surface 103*c* of the washing tub 103. Therefore, since the mark having a good imaging state is used to detect the tableware, it is possible to improve the accuracy of the detection.

Thirdly, a luminous body may be used as the recognition mark 104*b*. Therefore, it is possible to detect dishes stored in an area that is darker than the brightness of the recognition mark 104*b* in the detection image P2. The luminous body may include a light emitting diode (LED) element, a sheet-shaped phosphorescent member, or a strong reflection member.

Various modified examples of the method of detecting stored object such tableware, as in the rectangular detection image P2 when the recognition mark 104*b* is not installed, will be described.

Firstly, it is possible to estimate the position of the lower basket 107 and then specify the shape of the lower basket 107 based on the estimated position of the lower basket 107. In this case, it is appropriate that the plan shape (outer shape) of the lower basket 107 is various along the withdrawal direction of the lower basket 107. When the plane shape of the image of the basket is different from an image in an initial state in which the tableware is not stored, it may be identified that the tableware is stored.

Secondly, it is possible to estimate the position of the lower basket 107 and then specify the shape of the background of the estimated position (inner surface of the door 104). When the background image of the specified shape is different from an initial state in which the tableware is not stored, it may be identified that the tableware is stored.

Thirdly, when a difference is present between the image of the shape of the background (inner surface of the door 104) and the image when the lower basket 107 passes above the background, it may be identified that the tableware is stored.

Fourthly, it is possible to apply a certain color to the lower basket 107. Based on the image in the initial state in which the tableware is not stored, the number of pixel of the certain color component is recorded as an initial value. Accordingly, it is possible to identify whether the tableware is stored by measuring the change (reduced or increased) in the number of pixel of the certain color component.

Fifthly, it is possible to pre-acquire the plurality of rectangular images such as the plurality of detection images P2 every withdrawal position. Each rectangular image that is captured during detecting the tableware is compared with a corresponding rectangular image that is previously acquired. When there is a difference between two images, it may be identified that the tableware is stored.

Sixthly, it is possible to pre-capture an image of empty lower basket 107 and extract a linear component of wire material (wires) forming the lower basket 107. With respect to the extracted linear component in the initial state, it is possible to estimate the position of the lower basket 107. In addition, based on the image that is captured during detecting the tableware, it is identified that the tableware is stored in an area in which the linear component of the wire is broken.

Seventhly, it is possible to pre-capture an image of empty lower basket 107 and extract an intersection of wire material (wires) forming the lower basket 107. With respect to the extracted intersection in the initial state, it is possible to estimate the position of the lower basket 107. In addition, based on the image that is captured during detecting the tableware, it is identified that the tableware is stored in an area in which the intersection of the wire is covered, i.e., an area that is not present.

Eighthly, it is possible to model the lower basket 107 in the 3D by using one or more camera (visible camera 119). In this case, the image that is captured during detecting the tableware is modeled in the 3D and when the 3D reconstructed spatial coordinates is present other than the spatial coordinates of the lower basket 107, it may be identified that the tableware is stored.

Ninthly, it is possible to irradiate an image, which is composed of a certain pattern, toward the lower basket 107 from the capturing direction of the visible camera 119. For example, the certain pattern includes a pattern having a plurality of straight lines parallel to each other, or a pattern in which a plurality of straight lines intersecting each other. A reflection light of the pattern is captured by the visible camera 119, and when misalignment or distortion of the corresponding pattern occurs in the image, it may be identified that the tableware is stored.

Tenthly, by automatic spray of the dishwasher 101 or by manual spay of a user, it is possible to apply pigments or colored paints, which are washable by detergents, to objects to be washed, in the lower basket 107. Accordingly, the pigments applied to tableware are detected by the visible camera 119 and then it is possible to detect a position in which the tableware is stored in the lower basket 107.

In eleventh, inside the lower basket 107 or in the upper side thereof, it is possible to identify a position in which moving user's fingertip is temporarily stopped and then moved back, as the position in which the tableware is stored. In this case, it is required to identify whether the stored table ware is removed from the position in which the user's fingertip is returned.

Eighth Embodiment

Hereinafter an eighth embodiment of the present discloser will be described with reference to FIGS. 23 and 24.

Figure 23:
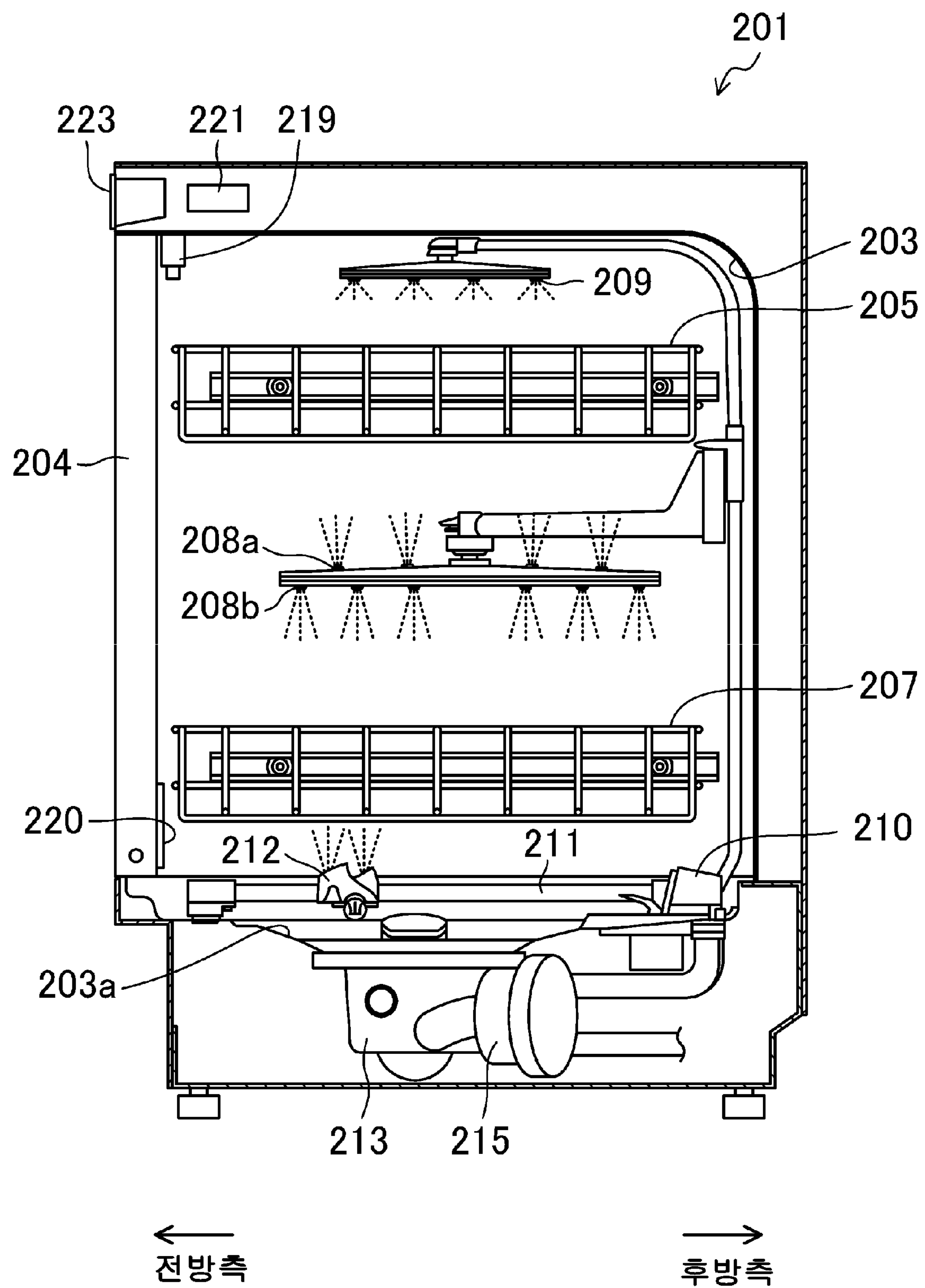
FIG. 23 is a cross-sectional view of a dishwasher according to an eighth embodiment of the present disclosure, in the front and rear direction.
Figure 24:
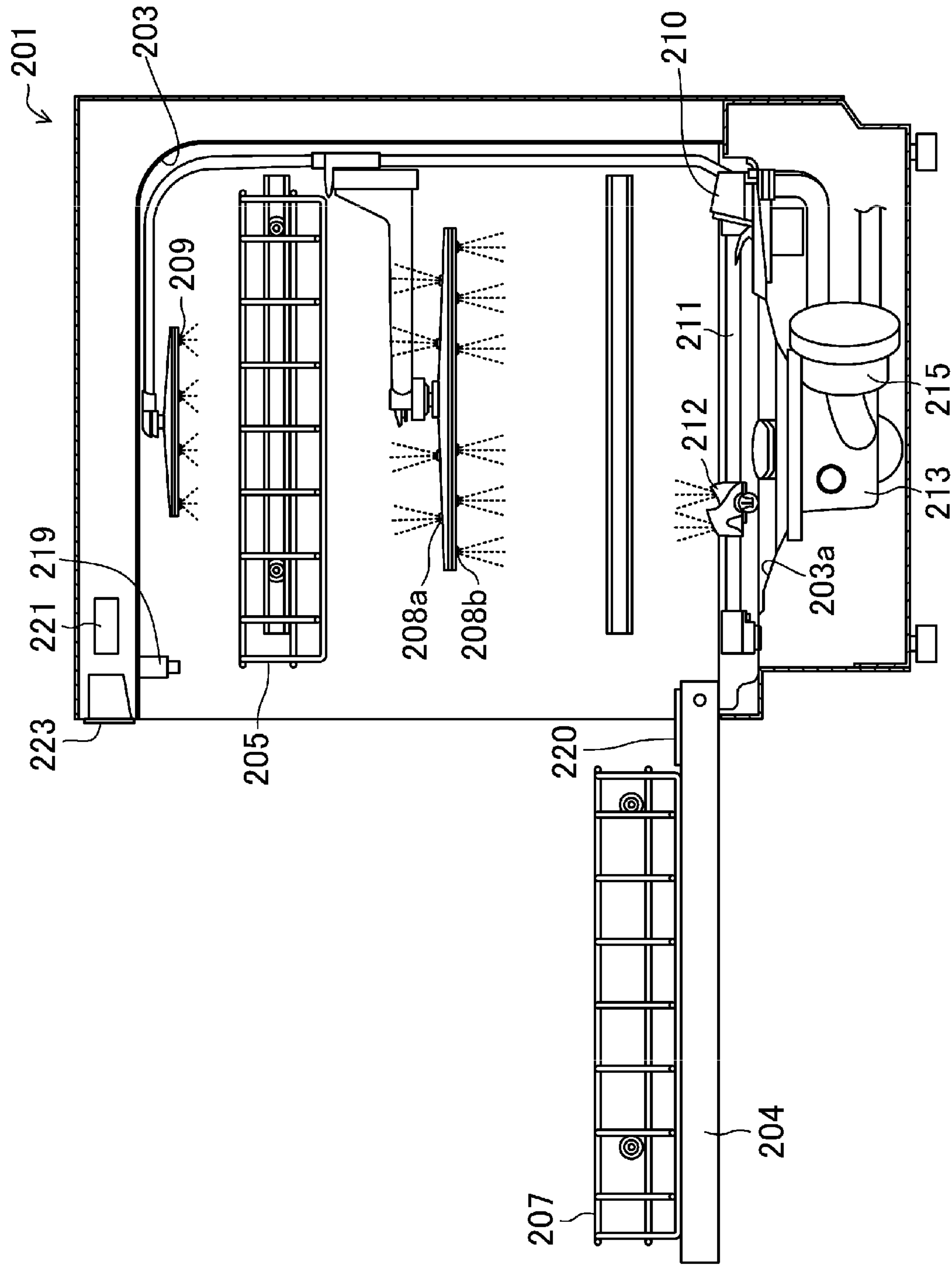
FIG. 24 is a cross-sectional view showing a state in which a door is opened in the dishwasher according to the eighth embodiment, in the front and rear direction.

FIG. 23 is a cross-sectional view of a dishwasher according to an eighth embodiment of the present disclosure, in the front and rear direction, and FIG. 24 is a cross-sectional view showing a state in which a door is opened in the dishwasher according to the eighth embodiment, in the front and rear direction.

FIGS. 23 and 24 are cross-sectional views in the front and rear direction of a dishwasher 201 according to an eight embodiment of the present disclosure.

Hereinafter a withdrawal direction of the dishwasher 201 is referred as a front side. The dishwasher 201 is provided with a hollow washing tub 203 that has an approximately cuboid shape and an opening configured to allow a dish to be input to or taken out of the front side thereof. In the opening, a door 204 configured to open and close the washing tub 203 is installed.

As illustrated in FIGS. 23 and 24, inside the washing tub 203, a dish storage upper basket 205 (hereinafter referred to as 'upper basket') accommodating dishes and a dish storage lower basket 207 (hereinafter referred to as 'lower basket') accommodating dishes are installed.

A plurality of lower rotatable nozzles 208*a* and 208*b* spraying water (washing water or rinsing water) to the upper and lower side is rotatably installed between the upper basket 205 and the lower basket 207.

In the upper side of the upper basket 205, a plurality of upper rotatable nozzles 209 spraying water to the lower side is rotatably is disposed.

A hollow fixed nozzle 210 corresponding to a washing portion extended in the width direction of the washing tub 203 is disposed in the vicinity of the lower end portion of the lower basket 207.

In the fixed nozzle 210, a plurality of injection holes spraying water horizontally to the front side is disposed at an interval in the width direction of the washing tub 203.

A rail 211 extended in the front and rear direction is disposed at an approximately central portion of the lower side width direction of the lower basket 207.

The rail 211 slidably supports a slide member 212 having a long shape extending in the width direction of the washing portion, from the lower side.

On the slide member 212, a collision surface in which water sprayed from the fixed nozzle 210 collides to change a traveling direction of the water upward, is formed along the entire length.

Although not shown, the slide member 212 is connected with a belt, and when a pulley in the rear side is rotated by an operation of the motor, the belt moves and then the slide member 212 is slide along the rail 211. Therefore, the driving mechanism may be composed of the belt, the pulley and the motor.

As illustrated in FIG. 23, in a bottom surface 203*a* of the washing tub 203, a tank 213 storing water by being connected to the bottom surface 203*a*, and a pump 215 discharging water stored in the tank 213 are disposed.

The pump 215 circulates the water stored in the tank 213 by pressing the water to the lower rotatable nozzle 208*a* and 208*b*, the upper rotatable nozzle 209, and the fixed nozzle 210.

As mentioned above, when water is sprayed horizontally forward from each injection hole of the fixed nozzle 210 by driving the pump 215 of the dishwasher 201 configured as described above, the water sprayed from the fixed nozzle 210 collides with the collision surface of the slide member 212 and is scattered upward to wash the dishware accommodated in the lower basket 207. At this time, when the motor is operated in a state in which the injection of water by the fixed nozzle 210 is continued, the slide member 212 slides in the front and rear direction along the rail 211, and thus the water is evenly distributed to the upper space in the slid range of the slide member 212.

(Method of Detecting Dish)

Hereinafter a method of detecting a dish according to the eighth embodiment of the present disclosure will be described with reference to FIGS. 25 to 28.

Figure 25:
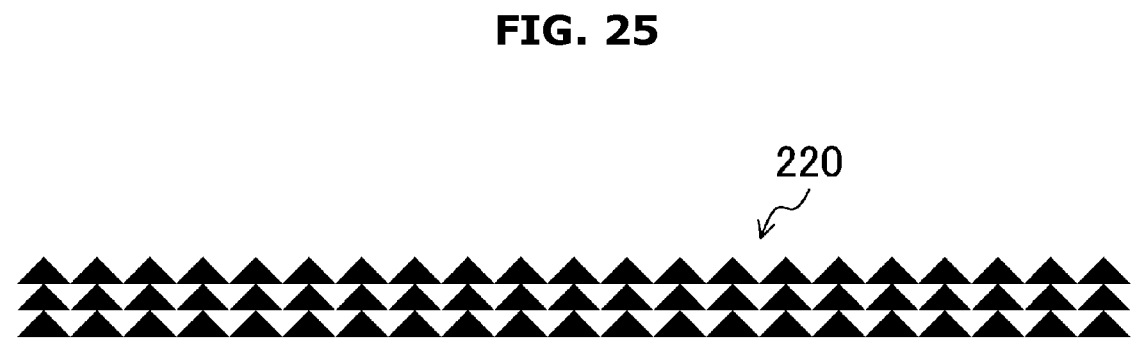
Figure 26:
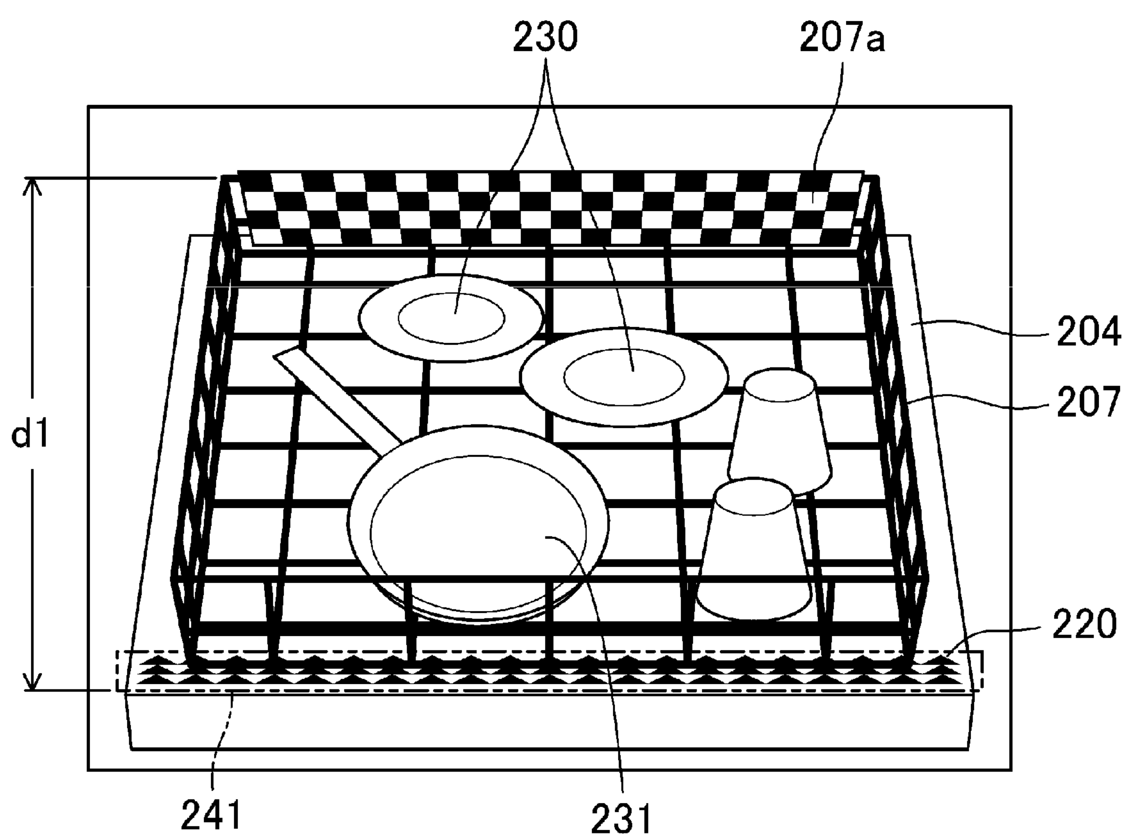
FIG. 26 is a perspective view showing a state in which tableware is stored in the storage basket that is taken out from the dishwasher according to the eighth embodiment.
Figure 27:
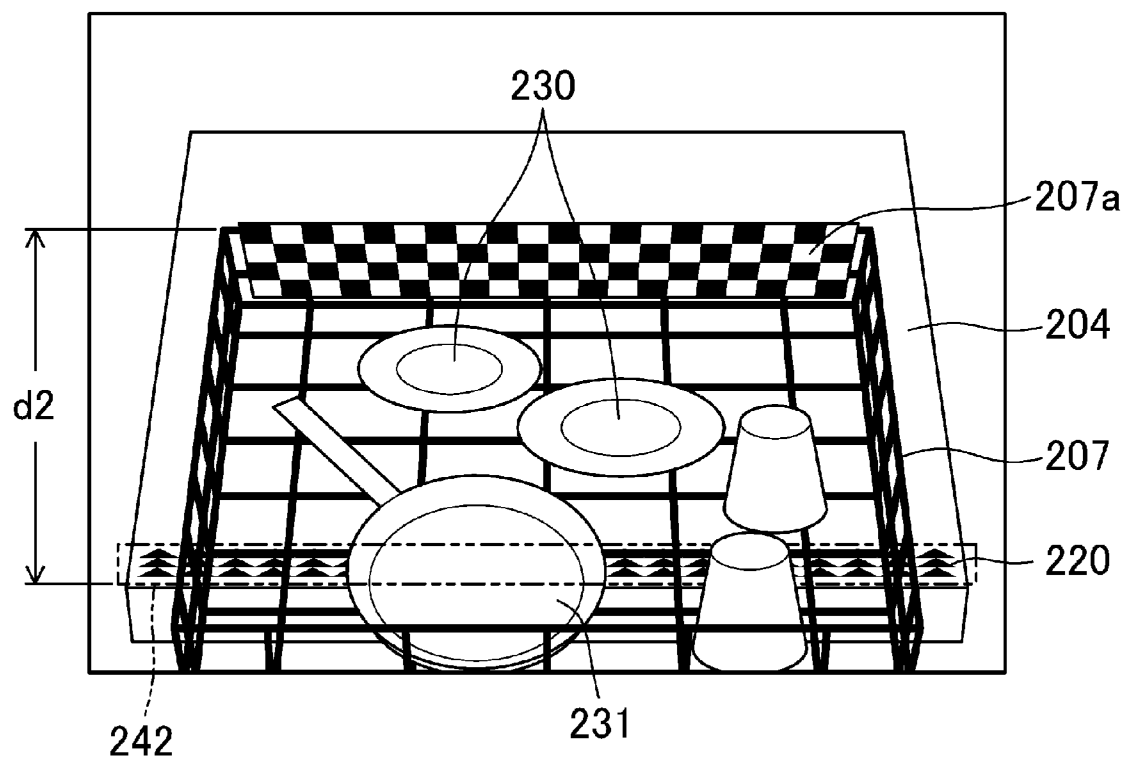
FIG. 27 is a perspective view showing a state in which the storage basket of FIG. 26 starts to be placed in a washing tub.
Figure 28:
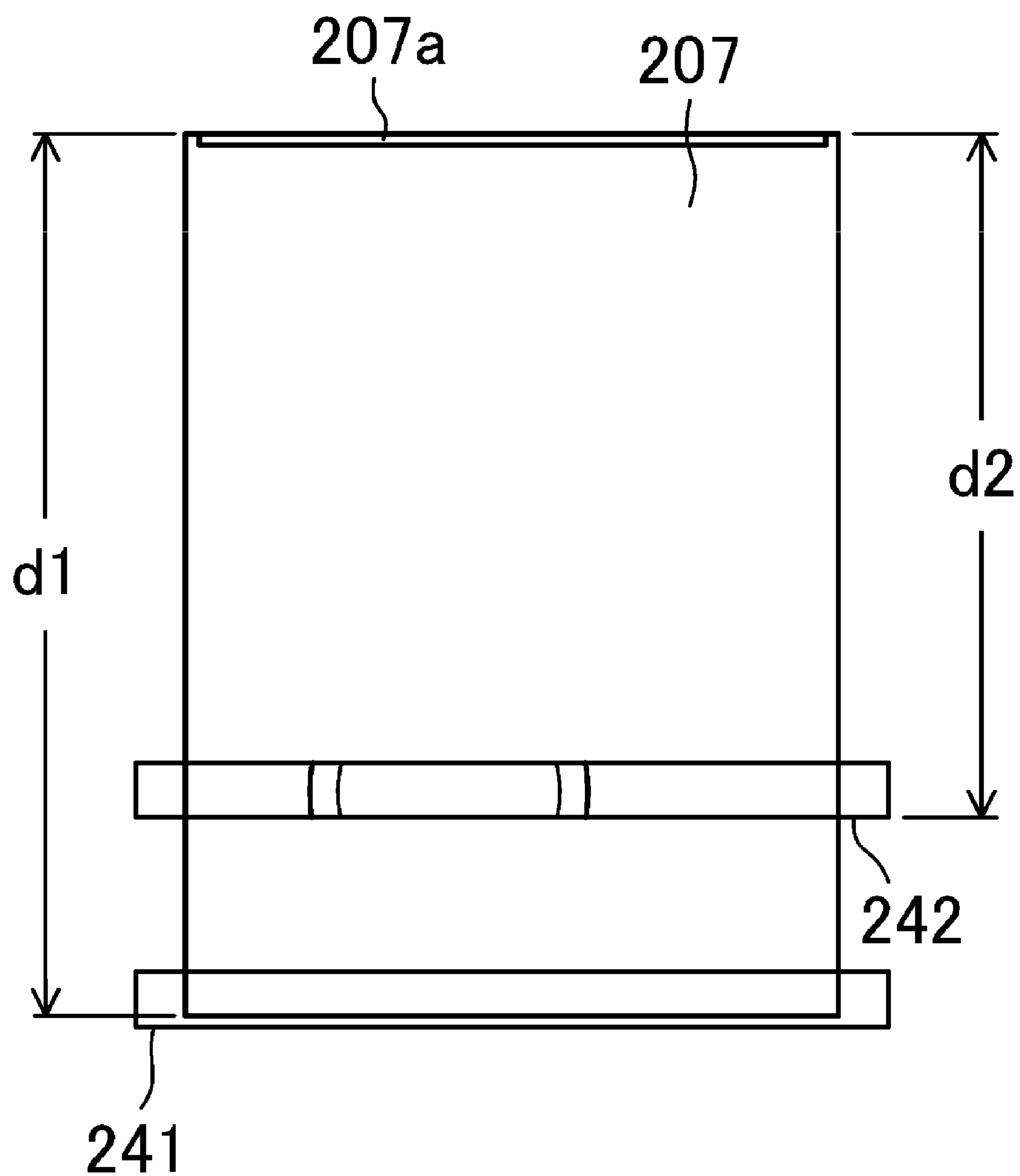
FIG. 28 is a development view showing a state in which each image of FIGS. 26 and 27 is developed as a plan view.

FIG. 25 is a plan view of a recognition mark configured to easily identify whether a dish is stored in a storage basket of the dishwasher according to the eighth embodiment, FIG. 26 is a perspective view showing a state in which tableware is stored in the storage basket that is taken out from the dishwasher according to the eighth embodiment, FIG. 27 is a perspective view showing a state in which the storage basket of FIG. 26 starts to be accommodated in a washing tub, and FIG. 28 is a development view showing a state in which each image of FIGS. 26 and 27 is developed as a plan view.

According to the eighth embodiment, as well as the presence of the dish stored in the lower basket 207, and the quantity of the dish stored in the lower basket 207, the dishwasher 201 recognizes a position of dish stored in the lower basket 207, i.e., an placement position, and selectively performs washing or rinsing on the placement area based on the recognized placement position of the dish.

Accordingly, as illustrated in FIGS. 23 and 24, according to the eighth embodiment, the dishwasher 201 is provided with a camera 219 corresponding to a detector configured to detect a dish, in the front side (particularly, the door side) with respect to a ceiling surface of the washing tub 203.

The camera 219 is not limited to a camera that responds to visible light, and thus the camera 219 may employ an area sensor that responses to infrared light.

According to the eight embodiment, the camera 219 does not a configuration to detect dish by directly capturing an image of the dish stored in the lower basket 207, but has a configuration to capture an image of a dish passing the upper side of the recognition mark 220 provided under the lower basket 207 while capturing an image of the recognition mark 220.

Particularly, for example, the recognition mark 220 is installed on at least area lower area of the door 204, and when the door 24 is open, the recognition mark 220 is installed on at least an end portion of the door 204 in the washing tub 203 side.

According to the eighth embodiment, the recognition mark 220 has a pattern in which a solid triangle on which any color is painted is stacked with three layers and then arranged in the entire width direction of the washing tub 203, as illustrated in FIG. 25. Each of the apexes of the plurality of triangles faces the upper side, i.e., the front side when the door 204 is opened.

The recognition mark 220 is not limited to the plurality of triangles, and thus the recognition mark 220 may include an arrangement pattern of other figures.

The recognition mark 220 is not limited to a pattern in which figures are combined, but may be composed of characters (Chinese character, hiragana, katakana, or various alphabet letters), symbols, color saturation or brightness, or combinations thereof.

A predetermined process is executed on an image (image data) captured by the camera 219, by a processor 221 including microprocessor unit (MPU). An operation control of the dishwasher 201 having the processor 221 may be performed by a controller installed in the upper end portion of the front surface of the washing tub 203, i.e., the upper side of the upper portion of the door 204.

FIG. 26 shows an image captured by the camera 219 according to the eighth embodiment.

In FIG. 26, the lower basket 207 is taken out on the door 204 and tableware 230 and 231 that is not washed is scattered and stored in the lower basket 207.

According to the embodiment, an identification pattern 207*a* having a checkered pattern is installed on the lateral end portion of the front side of the lower basket 207. By installing the identification pattern 207*a* to the lower basket 207, it is possible to easily detect a position that is farthest from the camera 219 of the lower basket 207 having a wire shape, i.e., a position corresponding to a reference point of the front side (outer side) of the lower basket 207. In addition, in the same manner as the recognition mark 220, the identification pattern 207*a* is not limited to a pattern in which figures are combined, but may be configured by characters, symbols, color saturation or brightness, or a combination thereof.

FIG. 26 shows that a distance between the identification pattern 207*a* and the recognition mark 220 is d1.

The detection and identification of the tableware on the image is performed in a first detection area 241 as illustrated in FIG. 26.

FIG. 27 shows an image in which a distance d2 between the identification pattern 207*a* and the lower basket 207 is d1>d2 since a part of the rear portion of the lower basket 207 is pushed and then accommodated in the washing tub (not shown).

In this case, the detection and identification of the tableware on the image is performed in a second detection area 242 as illustrated in FIG. 27.

As described above, in this embodiment, by always capturing the identification pattern 207*a* as an image, it is possible to calculate where the captured range (area) is placed in the lower basket 207.

For example, sequential images are introduced (recorded) at a speed of ten images per one second.

FIG. 28 is a development view showing a state in which each image of FIGS. 26 and 27 is developed as a plan view.

In FIG. 28, d1 and d2 that is developed on the plan view are calculated by using a distance from the camera 219 and by correcting an angle between an imaging portion of the camera 219 and the identification pattern 207*a* in the lower basket 207 on the door 204.

Since the corrected distance d1 that is a depth of the lower basket 207 is already provided, an average moving speed is calculated based on a time until the lower basket 207 starts to move and then accommodated in the washing tub 203. The average moving speed is varied according to the speed of the press-in motion of the user.

In addition, in this case, since 10 images are recorded every second, a single one image may serve as a 0.1 second counter. The distance d2 may be calculated based on the moving speed and the counter value.

In addition, an overlapped portion among images is deleted, when the motion, in which the lower basket 207 is accommodated in the washing tub 203, is stopped or when the lower basket 207 is withdrawn and then the accommodation motion is restarted.

When a missing portion is present in consecutive images, the missing portion may be generated by supplementing it using the preceding and following images.

As shown in FIG. 27, in the second detection area 242, a predetermined shape of the recognition mark 220, i.e., the entire shape of the mark, is not formed since a part of the tableware 231 such as a part of a frying pan, covers the recognition mark 220. Therefore, based on the identification pattern 207*a* of the lower basket 207, it is possible to specify the placement area, in which any tableware is stored, in the area of the corrected distance d2 corresponding to the withdrawal amount of the lower basket 207.

In this manner, as the consecutive capturing is performed by the camera 219 upon accommodating the lower basket 207, it is possible to calculate a range needing the washing and rinsing, inside the lower basket 207.

(Operation of Dishwasher)

Hereinafter an operation of the dishwasher 201 according to the eighth embodiment will be described with reference to FIG. 29.

Figure 29:
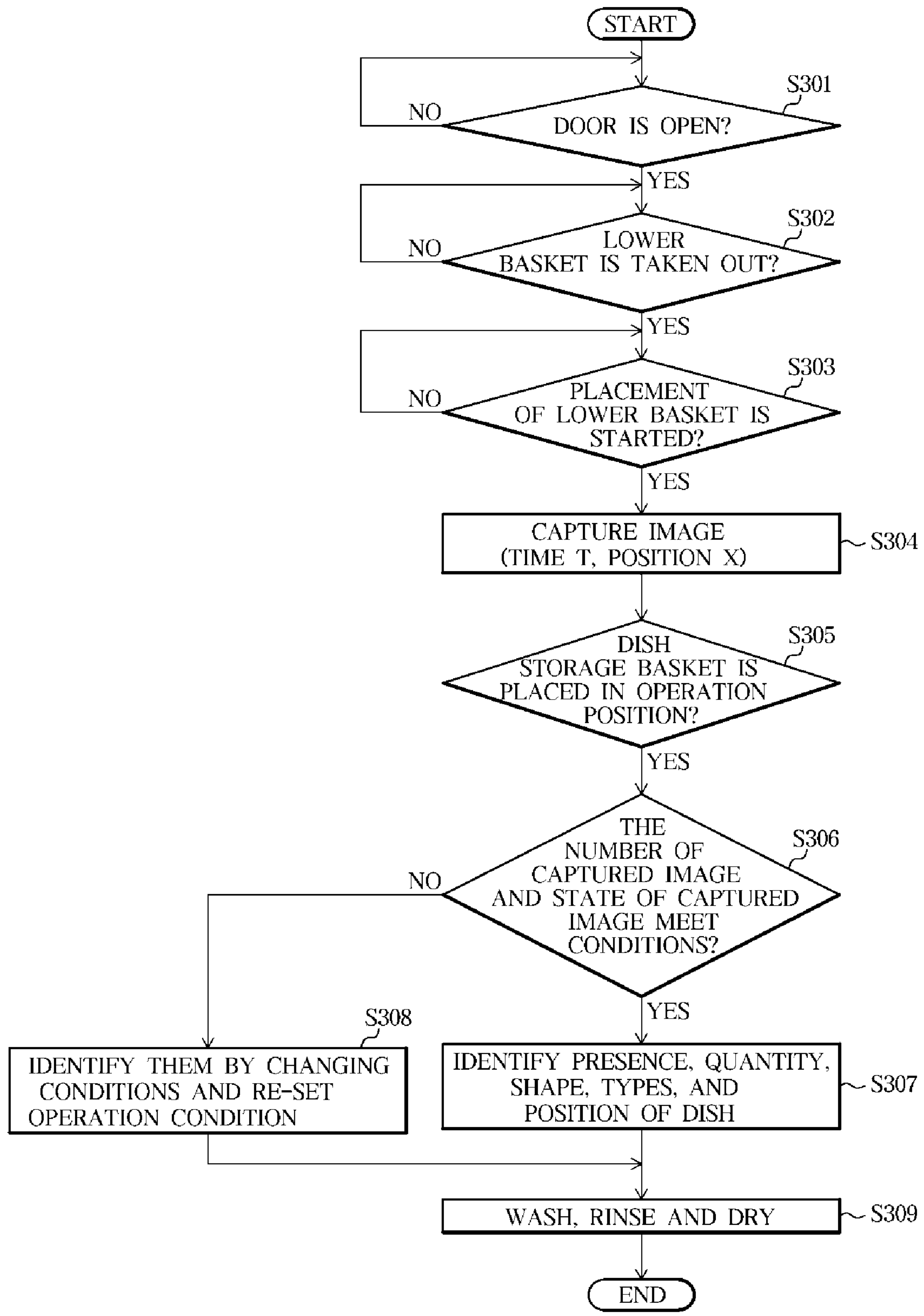
FIG. 29 is a flowchart showing an operation of the dishwasher according to the eighth embodiment.

FIG. 29 is a flowchart showing an operation of the dishwasher according to the eighth embodiment.

In FIG. 29, when power is supplied to the dishwasher 201, monitoring is continued until the door 204 is opened in step 301. When the door 204 is opened, the processor 221 proceeds to step 302 and waits until the lower basket 207 is taken out of the washing tub 203 onto the door 204.

When the lower basket 207 is taken out of the washing tub 203, the processor 221 proceeds to step 303, and waits until the tableware is placed in a certain position of the lower basket 207 and the movement of the lower basket 207 starts to be accommodated in the washing tub 203.

In addition, although the upper basket 205 is taken out in front (or behind) of the lower basket 207 and the tableware is stored (or not stored) in the upper basket 205, and then the upper basket 205 is accommodated in the washing tub 203 again, it does not affect the operation order of the dishwasher 201.

The operations of steps to 303 from step 302 correspond to a series operation such as opening the door 204 of the dishwasher 201, taking out at least the lower basket 207, storing dishes in the withdrawn lower basket 207, and putting the lower basket 207 to the operation position.

In step 303, when the movement of the lower basket 207 to be accommodated is detected, the processor 221 proceeds to step 304, and as illustrated in FIG. 26, the processor 221 starts to capture an image of the lower basket 207 having the recognition mark 220 corresponding to the background installed on the inner surface of the door 204.

As mentioned above, by using a moving time t and position information x corresponding to the time with respect the start of the capture of the image toward the rear side (the depth direction) of the lower basket 207 on the captured image, it is possible to identify a position on the lower basket 207 on the captured image. Step 304 is performed until the lower basket 207 is placed in a predetermined washing position of the washing tub 203.

In step 305, when the lower basket 207 is placed in the predetermined washing position (operation position), the processor 221 proceed to step 306.

In step 306, the processor 221 identifies whether the captured image contains a predetermined number of images, or whether the capturing state is satisfied with a predetermined condition, based on the relationship between the capturing time and the captured number of images. For example, when the capturing time is three seconds, the predetermined number of images is thirty. When such conditions are satisfied, the processor 221 identifies that the tableware is present in an area in which the recognition mark 220 is not identified, on a detection area of each captured image, in step 307. The tableware identification area includes the first detection area 241 and the second detection area 242 as illustrated in FIG. 28. The identification operation is performed on the entire of the lower basket 207.

At this time, as the identification of the dish, the processor 221 identifies the quantity of the dish, the shape of the dish (including a direction (vertical/horizontal direction) in which the tableware is placed) and the dish type (material), as well as the placement area of the dish. The dish type (material) includes ceramic, resin dish or glass dish. For example, when the dish is identified to be glass dish, it may be possible to perform a control such as reducing a temperature of water for the glass dish.

In addition, the processor 221 controls the slid member 212 corresponding to the washing portion, based on the result of the identification. That is, the processor 221 adjusts an operation time by selecting a washing range by corresponding to the displacement area of the dish. In this time, when it is identified that the quantity of the dish that is input to the dishwasher is relatively small, the amount of detergent for washing and the amount of rinsing water may be adjusted.

When the number of the captured image and the capturing state do not meet the predetermined condition in step 306, the processor 221 proceeds to step 308. In step 308, the image is insufficient to high-precisely identify the presence of dish, i.e., the placement position of the dish in the entire lower basket 207 corresponding to the detection target. In this case, the detection is performed with an identification condition that is changed. For example, it is identified that the dish is stored in an area having insufficient images thereabout and then a predetermined operation control is performed. Accordingly, it is possible to prevent the problem that the tableware is not sufficiently washed.

In step 309, the washing operation, the rinsing operation and the dry operation are sequentially performed according to the operation condition that is set in step 307 or 308, and the operation is completed.

As a modified example of the flowchart, it is possible to pre-define a certain portion of the lower basket 207 as an object that is not a dish and not related to the detection of the recognition mark 220. Particularly, wheels installed on both sides of the lower basket 207 are pre-defined as not a dish. Accordingly, it is possible to reduce amount of information that is to be processed for the identification of the dish.

First Modified Example: Placement Position of Recognition Mark

Hereinafter a first modification of the present disclosure will be described.

In the eighth embodiment, example of installing the recognition mark 220 at the lower end of the inner surface of the door 204 that opens and closes the washing tub 203, identifying the presence of the dish stored in the lower basket 207 by capturing an image of the lower basket 207 and the recognition mark 220 by a plurality of times during the entire of the lower basket 207 is moved from the withdrawal position to the operation position, and when it is identified that the dish is present, identifying the position (placement area), the quantity, and the type (material) of the dish, is described.

As mentioned above, other than the configuration in which the recognition mark 220 is installed on a portion of the door 204, a configuration in which the recognition mark 220 is installed on the entire surface of the inside of the door 204 may be allowed.

In this manner, by using a single image of the lower basket 207 and the recognition mark 220, it is possible to identify the presence, the position, the shape and the type (material) of the dish stored in the entire of the lower basket 207.

Accordingly, there is no limitation in the range in which the washing tub 203 and the recognition mark 220 are installed and the number of the captured image thereof.

Second Modified Example: Recognition of Basket

Hereinafter a second modified example will be described.

In the eighth embodiment, the detection of the position x of the lower basket 207 to the depth direction is performed by using the moving time t in the depth direction of the lower basket 207 and information of position x corresponding to the moving time t on the captured image. However, the detection of the position of the lower basket 207 may be performed by detecting the captured image or by a distance sensor such as an optical or magnetic sensor.

According to the eighth embodiment, the identification pattern **207*a* is installed on the front end portion of the lower basket 207 to easily recognize the front end portion of the lower basket 207. However, it is a merely example, and thus the location of the identification pattern 207*a*** is not limited thereto.

When installing the indicator, it is possible to dispose a symbol (index) indicating a distance (position) from the front end portion, on at least one side of the both sides of the lower basket 207, instead of the front end portion identification pattern **207*a* of the lower basket 207**.

Third Modified Example Selective Washing

Hereinafter a third modified example will be described.

According to the eighth embodiment, the slide member 212 having an elongated shape extended in the width direction is provided, and the slide member 212 is freely slidable on the rail and corresponds to the washing portion configured to selectively washing the placement area of the dish stored in the lower basket 207. Water spayed from the plurality of fixed nozzles 210 is in contact with the collision surface inclined about the slide member 212. However, the configuration according to the eighth embodiment is not limited thereto.

For example, the plurality of nozzles installed on the fixed nozzle 210 may be opened or closed independently of each other and each injection amount may be controlled. Accordingly, the processor 221 may change the washing range or optically control the washing time based on the result of the identification of the presence, the position and the shape of the dish stored in the lower basket 207.

Fourth Modified Example: Dish Detector: Presence of Recognition Mark

Hereinafter a fourth modified example will be described.

According to the eighth embodiment, the area sensor is used as the camera 219 corresponding to a device configured to capture an image of the lower basket 207 and the recognition mark 220 that is a background of the lower basket 207. However, a line sensor configured to selectively capture an image of an upper area of the recognition mark 220 may be used as the camera 219.

Fifth Modified Example: Device for Detecting Dish: Absence of Recognition Mark

Hereinafter a fifth modified example will be described.

According to the eighth embodiment, the recognition mark 220 serving as the background is installed on the detection portion of the lower basket 207, but it is not required to provide the recognition mark 220.

When the recognition mark 220 is not installed therein, a plurality of a light emitting (transmission) means such as light emitting diode (LED) is installed in the width direction of the washing tub 203, instead of the camera 219.

Further, instead of the recognition mark 220, a plurality of light receiving means such as Complementary Metal-Oxide Semiconductor (CMOS) sensor is installed to face the plurality of LEDs. At this time, it is not required to install the LED and the CMOS sensor on a one to one basis.

According to this configuration, it is identified that the dish is present on the CMOS sensor that does not receive light emitted from the LED.

Sixth Modified Example: Dish Detector: Absence of Recognition Mark

Hereinafter a sixth modified example will be described. According to the six modified example, the recognition mark 220 is not used but a distance (proximity) sensor configured as a single device is used instead of the detection means used in the fifth modified example, such as the LED corresponding to the light emitting means and the CMOS sensor corresponding to the light receiving means. As for the distance sensor, an emitted signal is not limited to light (electromagnetic waves including visible light) but ultrasonic waves may be used.

In this case, at least one distance sensor may be disposed instead of the camera 219 disposed on the front side of the ceiling surface of the washing tub 203.

In the above mentioned fourth, fifth, and sixth modified example, the distance sensor described in the second modified example may be used for recognizing the position of the lower basket 207.

The above mentioned various modified examples includes the eight embodiment and may be combined with other modified example as long as the physical inconsistencies do not occur.

As described above, according to the eighth embodiment, it is possible to perform capturing using the camera 219 corresponding to the imaging portion, and control the slide member 212 corresponding to the washing portion and control the washing range so as not to wash an area in which the dish is not stored, based on the identified placement area, quantity and shape of the dish. Therefore, it is possible to perform energy-saving operation and reduce the operation time.

According to the eighth embodiment, the predetermined recognition mark 220 is provided at a part that is a lower portion of the lower basket 207 and corresponds to the background of the image, and the moving time t in the depth direction of the lower basket 207 and information of position x corresponding to the moving time t are used. Accordingly, it is possible to high-precisely detect the placement position, quantity, shape and types (material) of the dish stored in the lower basket 207 based on the capturing state of the recognition mark 220 from the captured plurality of images.

According to the eighth embodiment, it is identified that there is the tableware in the portion where the recognition mark 220 cannot be identified based on the captured image. Therefore, even when a normal detection is not performed because contamination or water vapor occurs in the lens of the camera 219 or moisture is in contact with the lens or contamination is attached to the surface of the recognition mark 220, or the user' hand or a shield is disposed between the camera 219 and the lower basket 207 or the recognition mark 220, it is identified that there is the tableware. Therefore, it is possible to allow the corresponding area to be washed, and thus it is possible to prevent that unwashed dish is left due to the erroneous detection.

As a method of detecting the position of the tableware storage basket (lower basket 207), the first to seventh modified examples, in which the feature point (identification pattern 207*a*) serving as the indicator described in the first and second embodiments is not installed in the dish storage basket, may be applicable to the eighth embodiment.

Ninth Embodiment

Hereinafter an operation of a dishwasher according to a ninth embodiment of the present disclosure will be described with reference to FIG. 30. According to the ninth embodiment, the configuration of a dishwasher 201 is the same as that of the dishwasher 201 according to the eighth embodiment.

Figure 30:
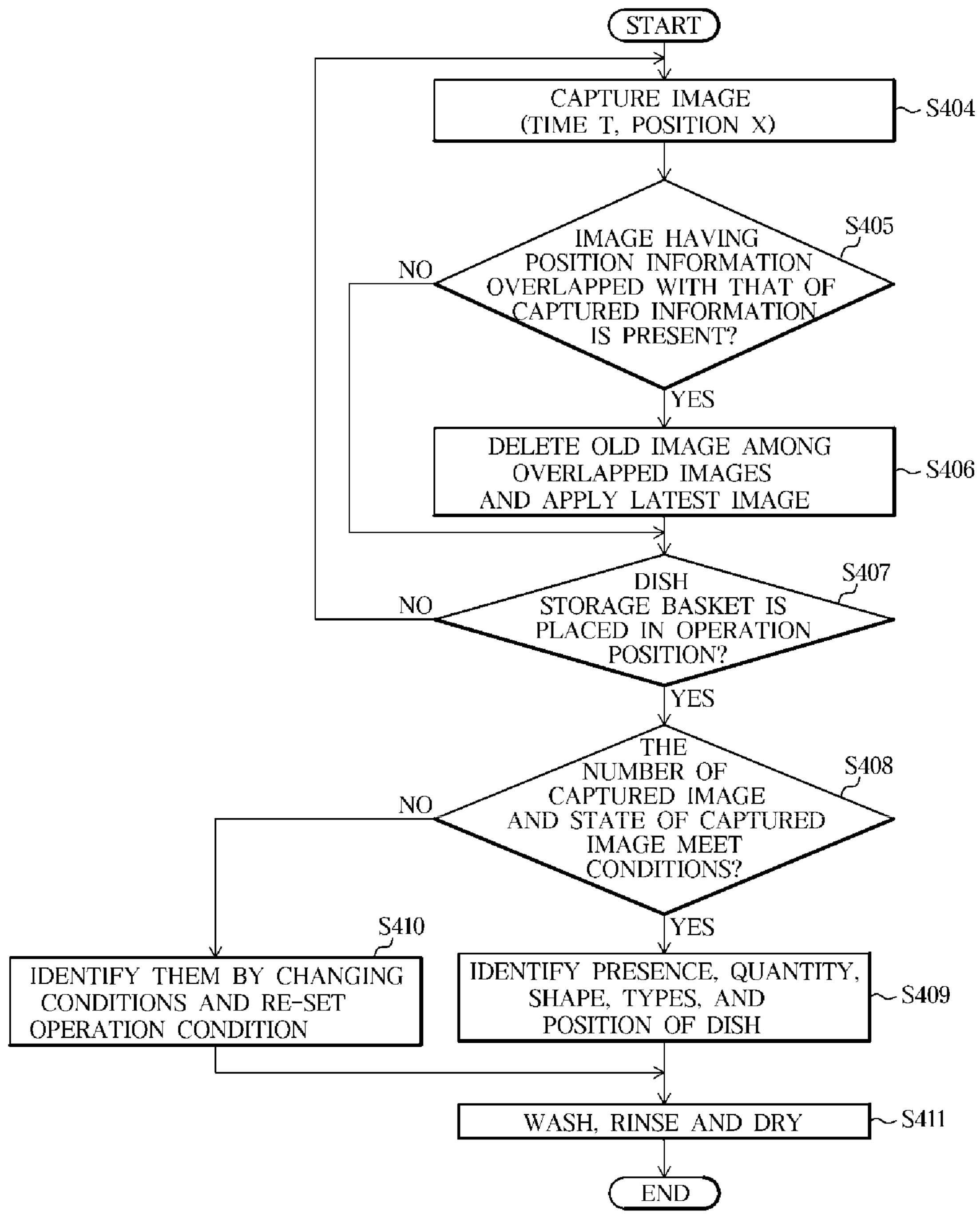
FIG. 30 is a flowchart showing an operation of a dishwasher according to a ninth embodiment.

FIG. 30 is a flowchart showing an operation of a dishwasher according to a ninth embodiment.

In FIG. 30, an operation of the processor 221 such that when the operation of the dishwasher 201 starts, the door 204 is opened, the lower basket 207 is taken out, the dish is stored in the lower basket 207 by a user, and the movement for the lower basket 207 in which the dish is stored for the accommodation is started, is the same as that of the first embodiment, and thus a description thereof will be omitted.

When the movement of the lower basket 207 to the washing tub 203 is started, the processor 221 starts to capture an image of the lower basket 207 including the recognition mark 220 serving as the background installed on the inner surface of the door 204 in step 404. The processor 221 identifies a position on the lower basket 207 on the captured image, by using a moving time t toward the rear side (the depth direction) of the lower basket 207 on the captured image and position information x corresponding to the time t.

Step 404 is performed until the lower basket 207 is placed in a predetermined washing position of the washing tub 203.

In step 405, the processor 221 identifies whether an image having overlapped position information with the captured image is present and when the image having the overlapped position information is present, the processor 221 proceeds to step 406.

In step 406, an image having older capturing time is deleted among the images having overlapped position information. A new image having latest capturing time is applied. A series of capturing is repeatedly performed from step 404 until the lower basket 207 is placed in the operation position in step 407.

In step 407, when the lower basket 207 is placed in the washing position (operation position), the processor 221 proceeds to step 408.

In step 408, whether the number of captured images and the capturing condition do meet the predetermined condition is identified and when them meets the condition, the processor 221 proceeds to step 409.

In step 409, the processor 221 identifies that the tableware is present in an area in which the recognition mark 220 is not identified, based on a detection area of each captured image.

The processor 221 identifies the quantity, shape (stored direction) and types (material) of the dish as well as the placement area of the dish, in the entire of the lower basket 207.

The processor 221 changes the washing range by controlling the slide member 212 corresponding to the washing portion, based on the result of the identification, and controls the washing time.

When the number of the captured image and the capturing state do not meet the predetermined condition in step 408, the processor 221 proceeds to step 410.

In step 410, the image is insufficient to high-precisely identify the presence of dish, i.e., the placement position of the dish in the entire lower basket 207 corresponding to the detection target. In this case, the detection is performed with an identification condition that is changed. For example, it is identified that the dish is stored in an area having insufficient images thereabout and then a predetermined operation control is performed.

In step 411, the washing operation, the rinsing operation and the dry operation are sequentially performed according to the operation condition that is set in step 409 or 410, and the operation is completed.

As mentioned above, according to the ninth embodiment, it is possible to acquire the effect the same as that of the eighth embodiment, and further when an image having overlapped position information with the captured image is present, it is possible to delete the image having the old capturing date among the images having overlapped position information, and it is possible to apply an image having the latest capturing date. Accordingly, even when a user irregularly moves the lower basket 207 such as returning the lower basket 207 to the front side again, or stopping the lower basket 207 on the movement, during the user stores dish to the lower basket 207 and puts the lower basket 207 to the operation position, it is possible to select the latest image, which is needed to detect the dish, from the plurality of captured images, and to high-precisely identify the displacement area, quantity, shape and types (material) of the dish stored in the lower basket 207, based on the state of the recognition mark 220 on the plurality of captured images.

As a method of detecting the position of the tableware storage basket (lower basket 207), the first to seventh modified examples, in which the feature point (identification pattern 207*a*) serving as the indicator described in the first and second embodiments is not installed in the dish storage basket, may be applicable to the ninth embodiment.

Tenth Embodiment

Hereinafter an operation of a dishwasher according to a tenth embodiment of the present disclosure will be described with reference to FIG. 31. According to the tenth embodiment, the configuration of a dishwasher 201 is the same as that of the dishwasher 201 according to the eighth embodiment. In addition, the recognition mark 220 serving as the background on the capture is configured with an arrangement (pattern) of regular figures, as illustrated in FIG. 25.

FIG. 30 is a flowchart showing an operation of a dishwasher according to a tenth embodiment.

Figure 31:
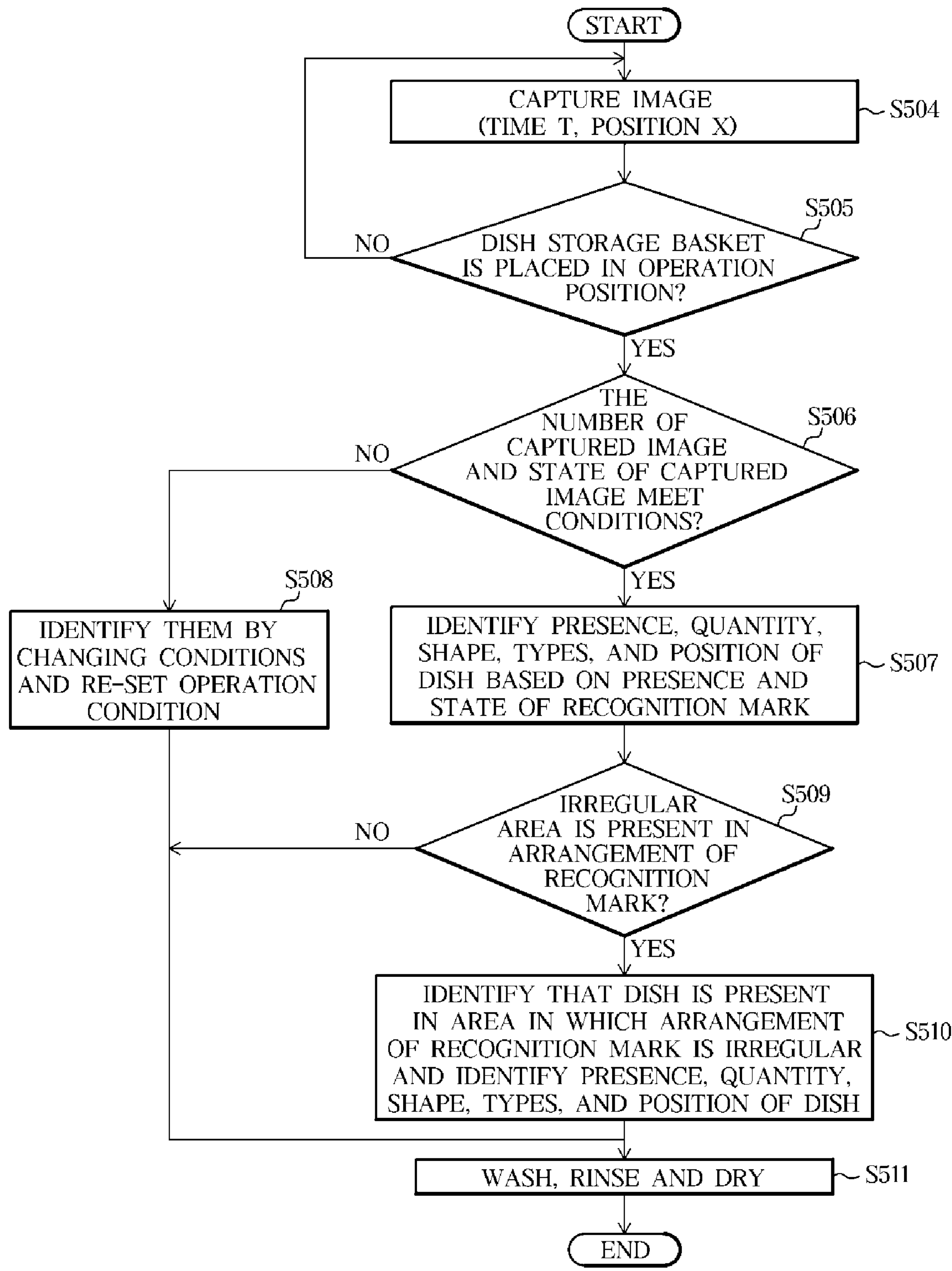
FIG. 31 is a flowchart showing an operation of a dishwasher according to a tenth embodiment.

In FIG. 31, an operation of the processor 221 such that when the operation of the dishwasher 201 starts, the door 204 is opened, the lower basket 207 is taken out, the dish is stored in the lower basket 207 by a user, and the movement for the lower basket 207 in which the dish is stored for the accommodation is started, is the same as that of the eighth embodiment, and thus a description thereof will be omitted.

When the movement of the lower basket 207 to the washing tub 203 is started, the processor 221 starts to capture an image of the lower basket 207 including the recognition mark 220 serving as the background installed on the inner surface of the door 204 in step 504. The processor 221 identifies a position on the lower basket 207 on the captured image, by using a moving time t toward the rear side (the depth direction) of the lower basket 207 on the captured image and position information x corresponding to the time t. Step 504 is performed until the lower basket 207 is placed in a predetermined washing position of the washing tub 203.

In step 505, when the lower basket 207 is placed in the washing position (operation position), the processor 221 proceeds to step 506.

In step 506, the processor 221 identifies whether the number of captured images and the capturing condition do meet the predetermined condition and when them meets the condition, the processor 221 proceeds to step 507.

In step 507, the processor 221 identifies that the tableware is present in an area in which the recognition mark 220 is not identified, on a detection area of each captured image. The processor 221 identifies the quantity, shape (stored direction) and types (material) of the dish as well as the placement area of the dish, in the entire of the lower basket 207.

In step 509, the processor 221 identifies whether an irregular area is present on the arrangement of the captured recognition mark 220. That is, the processor 221 identifies whether the recognition mark 220 has a distorted pattern without being hidden by the object.

When the irregular area is present in the arrangement of the recognition mark 220, the processor 221 identifies that the dish is present in an area that is identified to have the irregular area in the arrangement of the recognition mark 220.

The processor 221 identifies the quantity, shape (stored direction) and types (material) of the dish as well as the placement area of the dish, in the entire of the lower basket 207, again.

Based on the result of the identification, the processor 221 adjusts the operation time by changing the washing range by controlling the slide member 212 to an area that needs the washing.

When the irregular area is not present in the arrangement of the recognition mark 220, the processor 221 proceeds to step 511 such as washing, according to the content set in step 507.

When the number of the captured image and the capturing state do not meet the predetermined condition in step 506, the processor 221 proceeds to step 508.

In step 508, the image is insufficient to high-precisely identify the presence of dish, i.e., the placement position of the dish in the entire lower basket 207 corresponding to the detection target. In this case, the detection is performed with an identification condition that is changed. For example, it is identified that the dish is stored in an area having insufficient images thereabout and then a predetermined operation control is performed.

In step 511, the washing operation, the rinsing operation and the dry operation are sequentially performed according to the operation condition that is set in step 507, 508 or 510, and the operation is completed.

As mentioned above, according to the tenth embodiment, it is possible to acquire the effect the same as that of the eighth embodiment. Further, the recognition mark 220 having regular arrangement is installed in a part of the lower basket 207, an image of the lower basket 207 and the recognition mark 220 is captured, and the presence of an irregular area in the arrangement of the recognition mark 220 on the captured image is identified. When the irregular area is contained in the arrangement of the recognition mark 220, it is identified that the dish is present in the irregular area.

Accordingly, when dishes made of a material that is transparent and transmits light, such as a dish made of glass, e.g., a glass cup, are stored in the lower basket 207, the arrangement of the recognition mark 220, which is the background of the transparent dish, is irregular on the captured image due to the refraction of the light. By detecting the irregular arrangement, it is possible to high precisely detect the placement position, quantity, shape and types (material) although the stored dish is made of the transparent material.

The camera 219 corresponding to the imaging portion is not limited to the visible camera, and thus the camera 219 may employ an infrared camera.

Further, according to a modified example of the tenth embodiment, it is possible to detect at least the presence of the dish on the detected area, based on the number of the recognition mark 220 that is detected per unit area. Accordingly, although the dish is formed of a transparent material through which light is transmitted such as glass, it is possible to detect the dish formed of the transparent material such as glass, per unit area, and thus it is possible to increase the detection accuracy of the glass dish.

It is possible to reduce information processing amount per one time by detecting the dish per unit area, and thus it is possible to reduce the manufacturing costs as long as MPU or CPU embedded therein has the minimum capacity.

In the above mentioned embodiments and modified examples, as for the upper basket 205, when a washing portion has a configuration capable of selectively spraying water stream to a dish storage area of the upper basket 205, the present disclosure may be applicable to the upper basket 205 as well as the lower basket 207.

In the first to seventh embodiments, when a washing portion has a configuration capable of selectively spraying water stream to a dish storage area of the upper basket, the present disclosure may be applicable to the upper basket as well as the lower basket.

In addition, as a method of detecting the position of the dish storage basket (lower basket 207), the first to seventh modified examples, in which the feature point (identification pattern 207*a*) serving as the indicator described in the first and second embodiments is not installed in the dish storage basket, may be applicable to the tenth embodiment.

While the present disclosure has been particularly described with reference to exemplary embodiments, it should be understood by those of skilled in the art that various changes in form and details may be made without departing from the spirit and scope of the present disclosure.

INDUSTRIAL APPLICABILITY

As described above, the present disclosure is useful as the stored object detector and the method of detecting stored objects capable of capturing an image of a movable storage portion and objects stored in the storage portion and acquiring storage information including at least one of the position, size, and quantity of the stored objects based on the captured image. In addition, the present disclosure is useful as the dishwasher capable of identifying at least storage area of the dish stored in the dish storage basket.

The invention claimed is:

1. A dishwasher comprising:

a washing tub;

a storage portion installed in the washing tub to be withdrawable through an opening of the washing tub and configured to store a dish;

a door rotatable about a hinge between an opened position and a closed position, the door provided with a position identification pattern on an inside surface of the door;

an imaging portion configured to, when the door is in the opened position, capture an image including a part of the storage portion outside of the washing tub and a part of the inside surface of the door including the position identification pattern;

and a processor configured to:

obtain a feature point of the storage portion and the position identification pattern provided on the door from the image captured by the imaging portion, identify a position of the storage portion based on a distance between the feature point and the position identification pattern in the image, identify a placement area in which the dish is stored based on the position identification pattern, and identify a position of the dish based on the position of the storage portion and the placement area in which the dish is stored.

2. The dishwasher according to claim 1, wherein the processor is configured to obtain storage information comprising at least one of size and quantity of the dish based on the image captured by the imaging portion.

3. The dishwasher according to claim 1, wherein the feature point is a position recognition mark provided in the storage portion.

4. The dishwasher according to claim 3, wherein the position recognition mark is composed of characters, symbols, saturation, brightness or patterns or a combination thereof.

5. The dishwasher according to claim 1, wherein the processor is configured to identify the placement area based on an area in which the position identification pattern is not identified in the image.

6. The dishwasher according to claim 1, wherein:

the imaging portion is configured to capture an image of each of a plurality of withdrawal positions of the storage portion, and the processor is configured to select an image, which is needed to identify the dish, from the plurality of captured images and identify the placement area, quantity, shape, and types of the dish based on the position identification pattern of each of the plurality of captured images.

7. The dishwasher according to claim 1, further comprising:

a washing portion configured to wash the dish, wherein the processor is configured to selectively perform washing on an area in which the dish is disposed, by controlling the washing portion.

8. The dishwasher according to claim 7, wherein the processor is configured to regulate a washing time to allow washing to be selectively performed on the area in which the dish is disposed.

9. The dishwasher according to claim 1, wherein the imaging portion comprises a camera, an area sensor or a line sensor.

10. The dishwasher according to claim 1, wherein the processor is configured to obtain a withdrawal amount, representing that how far the storage portion is taken out of the washing tub, based on the feature point of the storage portion, and identify the position of the storage portion based on the withdrawal amount.

11. The dishwasher according to claim 1, wherein:

the feature point includes one or more indicators provided in the storage portion, and the processor is configured to identify at least one of the indicators from the image captured by the imaging portion and recognize the position of the storage portion based on a position of the at least one of the indicators.

12. The dishwasher according to claim 11, wherein the processor is configured to identify the at least one of the indicators based on at least one of a shape, color, characters, and figures of the at least one of the indicators.

* * * * *